United States Patent
Ebrahimi Afrouzi et al.

(10) Patent No.: US 10,935,383 B1
(45) Date of Patent: Mar. 2, 2021

(54) METHODS FOR FINDING THE PERIMETER OF A PLACE USING OBSERVED COORDINATES

(71) Applicants: Ali Ebrahimi Afrouzi, San Diego, CA (US); Lukas Fath, York (CA); Chen Zhang, Richmond (CA); Sebastian Schweigert, Sunnyvale, CA (US)

(72) Inventors: Ali Ebrahimi Afrouzi, San Diego, CA (US); Lukas Fath, York (CA); Chen Zhang, Richmond (CA); Sebastian Schweigert, Sunnyvale, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 16/542,287

(22) Filed: Aug. 15, 2019

Related U.S. Application Data

(63) Continuation of application No. 16/163,508, filed on Oct. 17, 2018, now Pat. No. 10,422,648.

(Continued)

(51) Int. Cl.
| | |
|---|---|
| *G01C 21/30* | (2006.01) |
| *G06T 7/55* | (2017.01) |
| *G06T 7/11* | (2017.01) |
| *H04N 5/225* | (2006.01) |
| *G05D 1/00* | (2006.01) |
| *G05D 1/02* | (2020.01) |
| *A47L 11/40* | (2006.01) |

(Continued)

(52) U.S. Cl.
CPC .......... *G01C 21/30* (2013.01); *A47L 11/4011* (2013.01); *G01C 21/206* (2013.01); *G01S 17/89* (2013.01); *G05D 1/0088* (2013.01); *G05D 1/0219* (2013.01); *G05D 1/0272* (2013.01); *G05D 1/0274* (2013.01); *G06T 7/11* (2017.01); *G06T 7/55* (2017.01); *G06T 7/62* (2017.01); *H04N 5/225* (2013.01); *A47L 2201/022* (2013.01); *A47L 2201/04* (2013.01); *G05D 1/0242* (2013.01); *G05D 1/0246* (2013.01); *G05D 1/0255* (2013.01); *G05D 1/0257* (2013.01); *G05D 2201/0215* (2013.01); *G06T 3/0068* (2013.01); *G06T 7/521* (2017.01); *G06T 2207/10028* (2013.01)

(58) Field of Classification Search
None
See application file for complete search history.

(56) References Cited

U.S. PATENT DOCUMENTS

| | | |
|---|---|---|
| 2004/0230340 A1 | 11/2004 | Fukuchi et al. |
| 2005/0182518 A1 | 8/2005 | Karlsson |

(Continued)

*Primary Examiner* — Rebecca A Volentine

(57) ABSTRACT

Provided is a method for navigating and mapping a workspace, including: obtaining a stream of spatial data indicative of a robot's position in a workspace, the stream of spatial data being based on at least output of a first sensor; obtaining a stream of movement data indicative of the robot's displacement in the workspace, the stream of movement data being based on at least output of a second sensor of different type than the first sensor; navigating along a path of the robot in the workspace based on the stream of spatial data; while navigating, mapping at least part of the workspace based on the stream of spatial data to form or update a spatial map in memory; and switching to a second mode of operation if the stream of spatial data is unavailable due to the first sensor becoming impaired or inoperative.

46 Claims, 8 Drawing Sheets

Related U.S. Application Data

(60) Provisional application No. 62/740,558, filed on Oct. 3, 2018, provisional application No. 62/746,688, filed on Oct. 17, 2018, provisional application No. 62/740,573, filed on Oct. 3, 2018, provisional application No. 62/740,580, filed on Oct. 3, 2018, provisional application No. 62/573,591, filed on Oct. 17, 2017, provisional application No. 62/637,185, filed on Mar. 1, 2018, provisional application No. 62/613,005, filed on Jan. 2, 2018, provisional application No. 62/599,216, filed on Dec. 15, 2017, provisional application No. 62/573,579, filed on Oct. 17, 2017, provisional application No. 62/637,156, filed on Mar. 1, 2018, provisional application No. 62/573,598, filed on Oct. 17, 2017, provisional application No. 62/591,217, filed on Nov. 28, 2017, provisional application No. 62/616,928, filed on Jan. 12, 2018, provisional application No. 62/614,449, filed on Jan. 7, 2018, provisional application No. 62/590,205, filed on Nov. 22, 2017, provisional application No. 62/666,266, filed on May 3, 2018, provisional application No. 62/661,802, filed on Apr. 24, 2018, provisional application No. 62/631,050, filed on Feb. 15, 2018, provisional application No. 62/640,444, filed on Mar. 8, 2018, provisional application No. 62/648,026, filed on Mar. 26, 2018, provisional application No. 62/655,494, filed on Apr. 10, 2018, provisional application No. 62/665,095, filed on May 1, 2018, provisional application No. 62/674,173, filed on May 21, 2018, provisional application No. 62/688,497, filed on Jun. 22, 2018.

(51) Int. Cl.
*G01C 21/20* (2006.01)
*G01S 17/89* (2020.01)
*G06T 7/62* (2017.01)
*G06T 7/521* (2017.01)
*G06T 3/00* (2006.01)

(56) References Cited

U.S. PATENT DOCUMENTS

| | | | |
|---|---|---|---|
| 2006/0012493 A1* | 1/2006 | Karlsson | G01C 21/12 340/995.24 |
| 2006/0165276 A1 | 7/2006 | Hong et al. | |
| 2007/0005306 A1 | 1/2007 | Foessel | |
| 2007/0271011 A1 | 11/2007 | Lee et al. | |
| 2008/0273791 A1* | 11/2008 | Lee | G05D 1/0274 382/153 |
| 2010/0121488 A1 | 5/2010 | Lee et al. | |
| 2011/0026833 A1 | 2/2011 | Sugino et al. | |
| 2011/0098923 A1 | 4/2011 | Lee | |
| 2011/0178709 A1 | 7/2011 | Park et al. | |
| 2011/0268349 A1 | 11/2011 | Choi et al. | |
| 2012/0196679 A1 | 8/2012 | Newcombe et al. | |
| 2012/0265391 A1* | 10/2012 | Letsky | G05D 1/0088 701/25 |
| 2014/0195148 A1 | 7/2014 | Erignac et al. | |
| 2014/0207282 A1* | 7/2014 | Angle | H04L 12/2809 700/257 |
| 2014/0350839 A1 | 11/2014 | Pack et al. | |
| 2015/0253777 A1 | 9/2015 | Binney et al. | |
| 2015/0362921 A1 | 12/2015 | Hanaoka et al. | |
| 2016/0082597 A1* | 3/2016 | Gorshechnikov | B25J 9/1664 700/253 |
| 2016/0129593 A1* | 5/2016 | Wolowelsky | G05D 1/0274 700/253 |
| 2016/0297072 A1* | 10/2016 | Williams | B25J 9/1697 |
| 2018/0275663 A1* | 9/2018 | Sonoura | B60L 15/2036 |
| 2018/0284802 A1* | 10/2018 | Tsai | G06K 9/00664 |

* cited by examiner

METHODS FOR FINDING THE PERIMETER OF A PLACE USING OBSERVED COORDINATES

CROSS-REFERENCE TO RELATED APPLICATIONS

This application is a Continuation of Non-Provisional patent application Ser. No. 16/163,508, filed Oct. 17, 2018, which claims the benefit of Provisional Patent Application Ser. No. 62/573,591, filed Oct. 17, 2017; 62/637,185, filed Mar. 1, 2018; 62/613,005, filed Jan. 2, 2018; 62/599,216, filed Dec. 15, 2017; 62/573,579, filed Oct. 17, 2017; 62/637,156, filed Mar. 1, 2018; 62/740,558, filed Oct. 3, 2018; 62/573,598, filed Oct. 17, 2017; 62/591,217, filed Nov. 28, 2017; 62/616,928, filed Jan. 12, 2018; 62/614,449, filed Jan. 7, 2018; 62/590,205, filed Nov. 22, 2017; 62/666,266, filed May 3, 2018; 62,661,802, filed Apr. 24, 2018; 62/631,050, filed Feb. 15, 2018; 62/746,688, filed Oct. 17, 2018; 62/740,573, filed Oct. 3, 2018; and 62/740,580, filed Oct. 3, 2018; 62/640,444, filed Mar. 8, 2018; 62/648,026, filed Mar. 26, 2018; 62/655,494, filed Apr. 10, 2018; 62/665,095, filed May 1, 2018; 62/674,173, filed May 21, 2018; 62/688,497, filed Jun. 22, 2018, each of which is hereby incorporated herein by reference.

In this patent, certain U.S. patents, U.S. patent applications, or other materials (e.g., articles) have been incorporated by reference. Specifically, U.S. patent application Ser. No. 15/243,783 (now U.S. Pat. No. 9,972,098), 62/208,791, Ser. Nos. 15/224,442, 15/674,310, 15/683,255, 15/949,708, 16/109,617, 16/048,185, 16/048,179, 15/614,284, 15/272,752, U.S. patent application titled Discovering and Plotting the Boundary of an Enclosure, by the same applicant, filed on the same day as this patent filing, and U.S. patent application titled Method for Constructing a Map While Performing Work, by the same applicant, filed on the same day as this patent filing are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present techniques relate to robotics, and more particularly, to finding the perimeter of a place for robotic devices.

BACKGROUND

For autonomous or semi-autonomous robotic devices to operate autonomously or with minimal input and/or external control within an environment, methods for mapping the environment are helpful such that the robotic device may autonomously remain and operate within the environment. Methods for mapping an environment have been previously proposed. For example, the collection and storage of a large amount of feature points from captured images of an environment wherein recognizable landmarks among the data may be identified and matched for building and updating a map has been proposed. Such methods can require significant processing power and memory due to the large amount of feature points extracted from the captured images, their storage and sophisticated techniques used in creating the map. For example, some methods employ an EKF technique where the pose of the robotic device and the position of features within the map of the environment are estimated and stored in a complete state vector while uncertainties in the estimates are stored in an error covariance matrix. The main drawback is the computational power required to process a large number of features having large total state vector and covariance matrix. Further, methods employing EKF can require accurate measurement noise covariance matrices a priori as inaccurate sensor statistics can lead to poor performance. Other methods of mapping an environment use a distance sensor of the robotic device to measure distances from the distance sensor to objects within the environment while tracking the position of the robotic device. For example, a method has been proposed for constructing a map of the environment by rotating a distance sensor 360-degrees at a measured rotational velocity while taking distance measurements to objects within the environment. While this method is simple, the method is limited as the mapping process of the environment relies on the distance sensor initially rotating 360-degrees. If the distance sensor is installed on a robotic device, for example, the robotic device may rotate 360-degrees initially to finish mapping the environment before performing work. Another similar method provides that the robotic device may immediately translate and rotate while measuring distances to objects, allowing it perform work while simultaneously mapping. The method however uses EKF SLAM approach requiring significant processing power. Some mapping methods describe the construction of an occupancy map, where all points in the environment are tracked, including perimeters, empty spaces, and spaces beyond perimeters, and assigned a status, such as "occupied," "unoccupied," or "unknown." This approach can have high computational costs. Other methods require the use of additional components for mapping, such as beacons, which must be placed within the environment. This is undesirable as additional components increase costs, take up space, and are unappealing to have within, for example, a consumer home.

None of the preceding discussion should be taken as a disclaimer of any of the described techniques, as the present approach may be used in combination with these or other techniques in some embodiments.

SUMMARY

The following presents a simplified summary of some embodiments of the present techniques in order to provide a basic understanding of the invention. This summary is not an extensive overview of the invention. It is not intended to identify key/critical elements of the invention or to delineate the scope of the invention. Its sole purpose is to present some embodiments of the present techniques in a simplified form as a prelude to the more detailed description that is presented below.

Some aspects include a method for navigating and mapping a workspace, including: obtaining, with one or more processors, a stream of spatial data indicative of a robot's position in a workspace, the stream of spatial data being based on at least output of a first sensor; obtaining, with one or more processors, a stream of movement data indicative of the robot's displacement in the workspace, the stream of movement data being based on at least output of a second sensor of different type than the first sensor; navigating, with the one or more processors, along a path of the robot in the workspace based on the stream of spatial data; while navigating, mapping, with the one or more processors, at least part of the workspace based on the stream of spatial data to form or update a spatial map in memory; switching to a second mode of operation if the stream of spatial data is unavailable due to the first sensor becoming impaired or inoperative, the second mode of operation including: navigating, with the one or more processors, along the path of the robot in the workspace based on the stream of movement data; and indicating, with the one or more processors, in memory areas of the spatial map covered by the robot based on the stream of movement data; wherein the spatial map of the at least part of the workspace expands as new areas of the workspace are covered by the robot and spatial data of the new areas of the workspace are obtained and used by the one or more processors to update the spatial map, and wherein the spatial map of the at least part of the workspace is segmented into two or more zones depending on the layout of the work space.

Some aspects include a robot, including: a drive motor of the robot; a cleaning tool of the robot; an exteroceptive sensor of the robot; a proprioceptive sensor of the robot; one or more processors of the robot; and memory of the robot storing instructions that when executed by at least some of the one or more processors effectuate operations comprising: obtaining, with one or more processors, a stream of spatial data indicative of a robot's position in a workspace, the stream of spatial data being based on at least output of a first sensor; obtaining, with one or more processors, a stream of movement data indicative of the robot's displacement in the workspace, the stream of movement data being based on at least output of a second sensor; navigating, with the one or more processors, along a path of the robot in the workspace based on the stream of spatial data; while navigating, mapping, with the one or more processors, at least part of the workspace based on the stream of spatial data to form or update a spatial map in memory; switching to a second mode of operation if the stream of spatial data is unavailable due to the first sensor becoming impaired or inoperative, the second mode of operation including: navigating, with the one or more processors, along the path of the robot in the workspace based on the stream of movement data; and indicating, with the one or more processors, in memory areas of the spatial map covered by the robot based on the stream of movement data; wherein the spatial map of the at least part of the workspace expands as new areas of the workspace are covered by the robot and spatial data of the new areas of the workspace are obtained and used by the one or more processors to update the spatial map, and wherein the spatial map of the at least part of the workspace is segmented into two or more zones.

BRIEF DESCRIPTION OF DRAWINGS

The present techniques are described with reference to the following figures.

DETAILED DESCRIPTION OF CERTAIN EMBODIMENTS

Figure 1A:
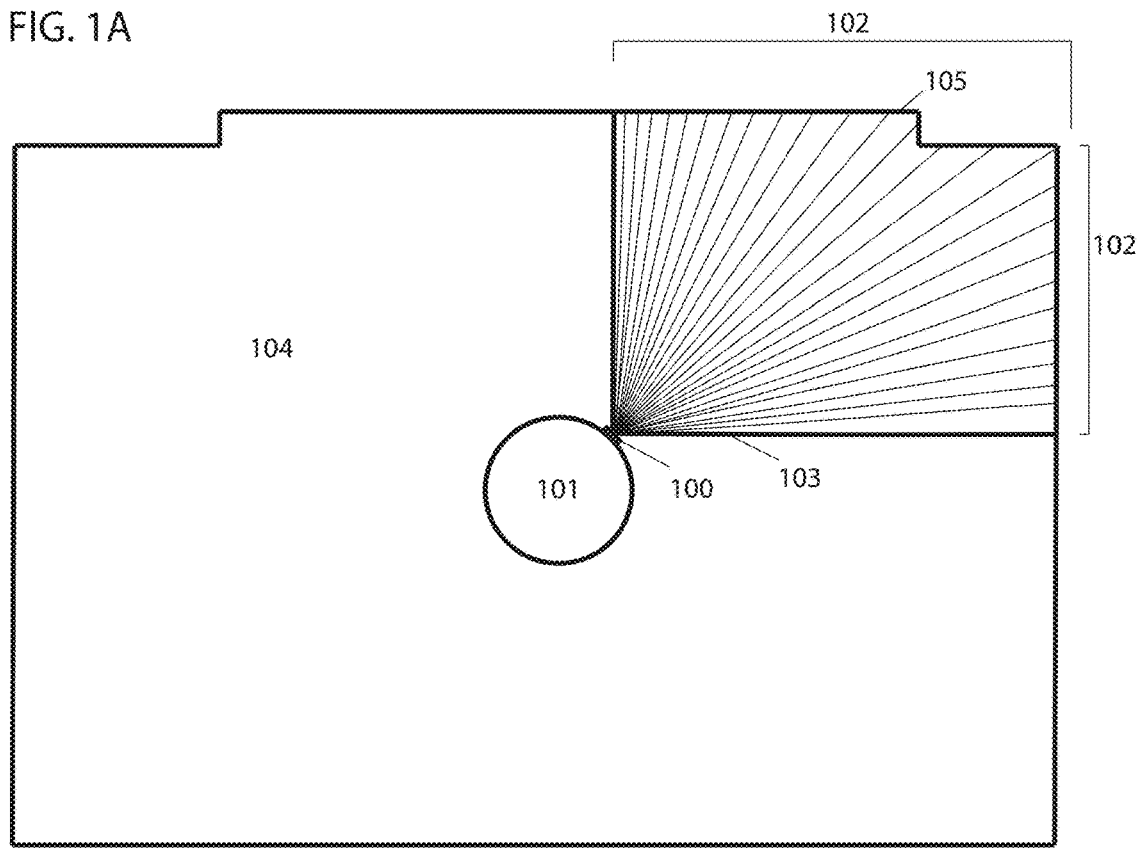
FIG. 1A illustrates depth vector measurements taken within a first field of view, as provided in some embodiments.

The present techniques will now be described in detail with reference to a few embodiments thereof as illustrated in the accompanying drawings. In the following description, numerous specific details are set forth in order to provide a thorough understanding of the present techniques. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implementing all of those techniques, as various cost and engineering trade-offs may warrant systems that only afford a subset of the benefits described herein or that will be apparent to one of ordinary skill in the art.

Embodiments introduced herein are expected to provide a computationally inexpensive solution for marking the perimeter of a place (or portion thereof) with minimal (or reduced) cost of implementation relative to traditional techniques. A place may include at least a section of a working environment, such as an area that contains objects including, but not limited to (a phrase which should not be read here or anywhere else in this document as implying other lists are limiting), furniture, obstacles, moving objects, walls, ceilings, fixtures, perimeters, items, components of any of the above, and/or other articles. A place may include an enclosed or open area that may be of any shape and that may, but does not need to have one or more openings, open sides, and/or open sections. In some embodiments, marking the perimeter of a place constitutes marking all perimeters and objects of the place, such that all areas of the place are marked in a map of the place. In other embodiments, marking the perimeter of a place constitutes marking a portion of the perimeters and/or objects of the place where only some areas of the place are marked in a map of the place. For example, a portion of a wall or piece of furniture within a place captured in a single field of view of a camera and used in forming a map of a portion of the place can constitute marking the perimeter of a place. Some embodiments provide methods and apparatuses for finding and marking the perimeter of a place using at least one imaging device, installed on a robotic device with at least one processor, capable of measuring depths (or acquiring data from which depths may be inferred) to perimeters of the place and objects within the place. An imaging device can include one or more devices such as image sensor, LIDAR, LADAR, depth camera, depth sensor, sonar, stereo vision camera, ultrasonic, or any other device or system capable of measuring depth or acquiring data from which depths may be inferred. For example, an image sensor such as a charge-coupled device (CCD) or complementary metal oxide semiconductor (CMOS) camera combined with at least one infrared (IR) illuminator, such as an IR point or line laser or any other structured form of light, can be used to estimate depths to perimeters and objects of a place. In some embodiments, an IR line laser is positioned at an angle to a horizontal plane and projects a laser line onto objects within the field of view of the image sensor. The image sensor captures images of the objects onto which the laser line is projected and sends them to an image processor. Using computer vision technology, the image processor extracts the position of the projected laser line. To determine the distance of the object, the image processor compares the position of the projected laser line to positions of laser lines in a preconfigured table relating position of the laser line to distance from the object. In another embodiment, an image sensor is combined with two IR point lasers positioned such that the laser points coincide at a predetermined distance from the image sensor. The two IR point lasers project laser points onto objects within the field of view of the image sensor, the image sensor captures images of the projected points, and an image processer determines the distance between the projected laser points. The image processor estimates the distance of objects by comparing the distance between the laser points to a preconfigured table relating distance between laser points to distance to an object. Objects may include, but are not limited to, articles, items, walls, perimeter setting objects or lines, furniture, obstacles, etc. that are included in the place. In some instances, consecutive images of an IR light projected onto objects within the place are taken using an image sensor and are compared to one another by an image processor to estimate distance. For example, the position of a laser point in consecutive images can be used by an image processor to determine change in distance from one image to another. In some embodiments, tasks of the imaging processor are executed by one or more other processors. For further details on how depth can be estimated using at least one image sensor coupled with at least one IR emitter see U.S. patent application Ser. Nos. 15/243,783, 62/208,791, 15/674,310, and 15/224,442, the entire contents of which are hereby incorporated by reference.

In other embodiments, depth is estimated using a time-of-flight camera wherein depth is estimated based on the time required for light to reflect off of an object and return to the camera or using an ultrasonic sensor wherein depth is estimated based on the time required for a sound pulse to reflect off of an object and return to the sensor. In other embodiments, other types of devices or systems capable of estimating depth or acquiring data from which depth can be inferred can be used. For example, in some embodiments an imaging device captures depth images containing depth vectors to objects, from which the Euclidean norm of each vector can be calculated by a processor, representing the depth from the camera to objects within the field of view of the camera. In some instances, depth vectors originate at the imaging device and are measured in a two-dimensional plane coinciding with the line of sight of the imaging device. In other instances, a field of three-dimensional vectors originating at the imaging device and arrayed over objects in the environment are measured.

In some embodiments, raw data (e.g., sensed information from which depth or other information has not been inferred), such as time required for a light or sound pulse to reflect off of an object or pixel intensity may be used directly (e.g., without first inferring depth) in creating a map of an environment, which is expected to reduce computational costs, as the raw data does not need to be first processed and translated into depth values, e.g., in metric or imperial units. In the examples provided herein depth values in metric or imperial units may be used to identify the perimeter of the place for illustrative purposes; however, other measurements such as time required for light or sound to reflect off of an object may be used to identify the perimeter of the place and objects within the place. In instances where at least one camera is used to capture images of light projected from at least one IR illuminator onto objects, the position of pixels with high intensity may be used directly to infer depth. The position of the laser light in each image is determined by a processor of the robotic device by identifying pixels with high brightness (e.g., having greater than a threshold delta in intensity relative to a measure of central tendency of brightness of pixels within a threshold distance).

The processor may include, but is not limited to, a system or device(s) that perform, for example, methods for receiving and storing data; methods for processing data, including depth data; methods for processing command responses to stored or processed data, to the observed environment, to internal observation, or to user input; methods for constructing a map or the boundary of an environment; and methods for navigation, actuation, and other operation modes. For example, the processor may receive data from an obstacle sensor, and based on the data received, the processor may respond by commanding the robotic device to move in a specific direction. As a further example, the processor may receive image data of the observed environment, process the data, and use it to create a map of the environment. The processor may be a part of the robotic device, the camera, a navigation system, a mapping module or any other device or module. The processor may also comprise a separate component coupled to the robotic device, the navigation system, the mapping module, the camera, or other devices working in conjunction with the robotic device. More than one processor may be used.

In some embodiments, an image sensor, installed on a robotic device with at least one processor, for example, acquires data to estimate depths from the image sensor to objects within a first field of view. In some embodiments, the image sensor (e.g., the sensor or the sensor in conjunction with a processor of the robot) measures vectors (e.g., two or three dimensional vectors corresponding to physical space) from the image sensor to objects in the place and the processor calculates the L2 norm of the vectors using $\|x\|_P = (\Sigma_i |x_i|^P)^{1/P}$ with P=2 to estimate depths to objects. In some embodiments, the processor translates each depth estimate into a coordinate by iteratively checking each coordinate within the observed coordinate system of the robotic device until the coordinate that coincides with the location of the depth estimated is identified. Each coordinate of the coordinate system coincides with a location within the environment. The coordinate system may be of different types, such as a Cartesian coordinate system, a polar, homogenous, or another type of coordinate system. In some embodiments, the processor identifies the coordinates coinciding with the depths estimated as perimeters of the place while coordinates bound between the perimeter coordinates and the limits of the first field of view of the image sensor are identified as an internal area. In some embodiments, coordinates representing the perimeters of the environment are stored in memory of the robotic device in the form of a matrix or finite ordered list. In another embodiment, the processor marks the coordinates representing the perimeters of the environment in a grid to create a visual (in the sense that the data structure may be a bitmap, not in the sense that it is necessarily depicted) map of the environment. In other embodiments, perimeter coordinates are stored or represented in other forms. In some embodiments, coordinates corresponding to internal areas may be stored or marked in a similar fashion.

In embodiments, the robotic device begins to perform work within the internal area, following along a movement path, such as a coverage path formed with a coverage path planning algorithm like those described by E. Galceran and M. Carreras, *A survey of coverage path planning for robotics*, Robotics and Autonomous Systems, 61(12), 2013, the contents of which are hereby incorporated by reference. In some embodiments, the processor marks areas covered by the robotic device in order to avoid repeat coverage.

As the robotic device with mounted image sensor translates and rotates within the internal area, the image sensor continuously acquires data and the processor continuously estimates depths from the image sensor to objects within the field of view of the image sensor. After estimating depths within each new field of view, the processor translates depth estimates into coordinates corresponding to the observed coordinate system of the robotic device and identifies them as perimeter, thereby expanding the discovered perimeters and internal areas with each new set of depth estimates. As the internal area within which the robotic device operates expands, new perimeters and internal areas of the place are reached and discovered. The robotic device continues to perform work within the continuously expanding internal area while the image sensor acquires data and the processor estimates depths and translates them into coordinates corresponding to the observed coordinate system of the robotic device, identifying them as perimeter of the place until at least a portion of the perimeter of the place is identified.

In some embodiments, empty spaces, perimeters, and spaces beyond the perimeter are captured by the image sensor, processed by the processor, stored in a memory, and expressed in an occupancy map by the processor, wherein each point within the occupancy map is assigned a status such as "unoccupied," "occupied," or "unknown." Some embodiments may assign scores indicative of confidence in these classifications, e.g., based on a plurality of measurements that accumulate to increase confidence. By reducing the number of points processed and stored, however, the expressed computational costs are expected to also be reduced. For example, points beyond the perimeters may not always be processed.

In some embodiments, the robotic device and image sensor may move as a single unit (e.g., with zero degrees of freedom of relative movement), wherein the image sensor is fixed to the robotic device, the robot having three degrees of freedom (e.g., translating horizontally in two dimensions relative to a floor and rotating about an axis normal to the floor), or as separate units in other embodiments, with the image sensor and robot having a specified degree of freedom relative to the other, both horizontally and vertically. In such cases, the rotation of the mounted image sensor in relation to the robotic device is measured. For example, but not as a limitation (which is not to imply that other descriptions are limiting), the specified degree of freedom of an image sensor with a 90 degrees field of view with respect to the robotic device may be within 0-180 degrees vertically and within 0-360 degrees horizontally.

In some embodiments, a processor (or set thereof) on the robot, a remote computing system in a data center, or both in coordination, may translate depth measurements from on-board sensors of the robot from the robot's (or the sensor's, if different) frame of reference, which may move relative to a room, to the room's frame of reference, which may be static. In some embodiments, vectors may be translated between the frames of reference with a Lorentz transformation or a Galilean transformation. In some cases, the translation may be expedited by engaging a basic linear algebra subsystem (BLAS) of a processor of the robot.

In some embodiments, the robot's frame of reference may move with one, two, three, or more degrees of freedom relative to that of the room, e.g., some frames of reference for some types of sensors may both translate horizontally in two orthogonal directions as the robot moves across a floor and rotate about an axis normal to the floor as the robot turns. The "room's frame of reference" may be static with respect to the room, or as designation and similar designations are used herein, may be moving, as long as the room's frame of reference serves as a shared destination frame of reference to which depth vectors from the robot's frame of reference are translated from various locations and orientations (collectively, positions) of the robot. Depth vectors may be expressed in various formats for each frame of reference, such as with the various coordinate systems described above. (A data structure need not be labeled as a vector in program code to constitute a vector, as long as the data structure encodes the information that constitutes a vector.) In some cases, scalars of vectors may be quantized, e.g., in a grid, in some representations. Some embodiments may translate vectors from non-quantized or relatively granularly quantized representations into quantized or coarser quantizations, e.g., from a sensor's depth measurement to 16 significant digits to a cell in a bitmap that corresponds to 8 significant digits in a unit of distance. In some embodiments, a collection of depth vectors may correspond to a single location or pose of the robot in the room, e.g., a depth image, or in some cases, each depth vector may potentially correspond to a different pose of the robot relative to the room.

Prior to measuring vectors from the image sensor to objects within each new field of view, estimating depths, and translating them into coordinates, the processor may adjust previous coordinates to account for the measured movement of the robotic device as it moves from observing one field of view to the next (e.g., differing from one another due to a difference in image sensor pose). This adjustment accounts for the movement of the coordinate system observed by the image sensor of the robotic device with respect to a stationary coordinate system that may or may not coincide with the first field of view of the image sensor. In instances wherein the image sensor and robotic device move as a single unit, the observed coordinate system of the image sensor, within which coordinates are identified as perimeter, moves with respect to the stationary coordinate system as the robotic device moves. In some embodiments, a movement measuring device such as an odometer, gyroscope, optical flow sensor, etc. measures the movement of the robotic device and hence the image sensor (assuming the two move as a single unit) as the image sensor moves to observe new fields of view with corresponding new observed coordinate systems. In some embodiments, the processor stores the movement data in a movement vector and transforms all perimeter coordinates to correspond to, for example, the initial coordinate system observed by the image sensor coinciding with the stationary coordinate system. For example, in an embodiment where C is a stationary Cartesian coordinate system, C0 may be the observed coordinate system of an image sensor fixed to a robotic device at time t0 with state S and coinciding with stationary coordinate system C. The robotic device with attached image sensor displaces and the image sensor observes coordinate system C1 at time t1 with state S'. A movement measuring device measures the movement vector V with values (x, y, theta) and the processor uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter to correspond to a single coordinate system. Some embodiments of the present techniques reduce a non-trivial problem to simple addition of vectors. Embodiments of this approach may be a lossy compression of the state world; but, by adjusting resolutions and creatively using mathematical estimations, acceptable results can be achieved for most home environments. With a holistic, stationary, or global coordinate system in which the image sensor of the robotic device observes a local coordinate system, a function that relates the local observations of the image sensor to the stationary or global observation can be created. A challenge can be estimating a reliable function that can provide high accuracy. For example, accounting for scenarios wherein the surface on which the robotic device operates is unlevelled whereby the odometer may measure a depth greater or smaller than the true 2D displacement. Methods for eradicating such issues have been suggested in U.S. patent application Ser. No. 15/683,255, the entire contents of which are hereby incorporated by reference, whereby a processor of the robotic device monitors declining depth measurements as a depth measurement device of the robotic device moves towards a stationary object. If the steady decline of measurements is interrupted by a predetermined number of measurements that are a predetermined percentage greater than the measurements immediately before and after the interruption, the processor discards the interrupting measurements.

In some embodiments, the robotic device may have more than one movement measuring device in order to measure movement between each time step or fields of view observed. For example, the robotic device may have gyroscopes and odometers that simultaneously provide redundant information. In many implementations, only one set of information is used by the processor of the robotic device while the other is discarded. In other implementations, the processor combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the processor calculates movement of the robotic device by combining the measurements from the first and second device, or selects measurements from one device as more accurate than the others. For example, the processor may combine measurements from the first device and the second device (or measurements from more devices, like more than three, more than five, or more than 10) using a moving average (or some other measure of central tendency may be applied, like a median or mode). The processor may also use minimum sum of errors to adjust and calculate movement of the robotic device to compensate for the lack of precision between the measurements from the first and second device. By way of further example, the processor may use minimum mean squared error to provide a more precise estimate of the movement of the robotic device. The processor may also use other mathematical methods to further process measured movement of the robotic device by the first and second device, such as split and merge algorithm, incremental algorithm, Hough Transform, line regression, Random Sample Consensus, Expectation-Maximization algorithm, or curve fitting, for example, to estimate more realistic movement of the robotic device. In another embodiment, the processor may use the k-nearest neighbors algorithm where each movement measurement is calculated as the average of its k-nearest neighbors.

In some embodiments, the processor fixes a first set of readings from, for example, a gyroscope and uses the readings as a reference while transforming a second set of corresponding readings from, for example, an odometer to match the fixed reference. In some embodiments, the processor combines the transformed set of readings with the fixed reference and uses the combined readings as the new fixed reference. In another embodiment, the processor only uses the previous set of readings as the fixed reference. In some embodiments, the processor iteratively revises the initial estimation of a transformation function to align new readings to the fixed reference to produce minimized distances from the new readings to the fixed reference. The transformation function may be the sum of squared differences between matched pairs between new readings and the fixed reference. For example, in some embodiments, for each value in the new readings, the processor finds the closest value among the readings in the fixed reference. The processor uses a point to point distance metric minimization technique such that each value in the new readings is aligned with its best match found in the fixed reference. In some embodiments, the processor uses a point to point distance metric minimization technique that estimates the combination of rotation and translation using a root mean square. The processor repeats the process to transform the values of new readings to the fixed reference using the obtained information. In using this mathematical approach, the accuracy of the estimated movement of the robotic device is improved, subsequently improving the accuracy of the movement vector used in relating all coordinates to one another and in forming the perimeter of the place. Further, this approach is expected to accumulate less noise and reduce corrections common in the current state of the art. In some embodiments, the processor applies the k-nearest neighbors algorithm to redundant readings with discrepancies. The processor may use these methods independently or in combination to improve accuracy.

In some embodiments, the processor has access to multiple coordinate systems with different resolutions and is able to switch from one resolution to another depending on the accuracy required. For example, the processor of the robotic device may use a high-resolution coordinate system when finding the perimeter of the place and a low-resolution coordinate system when covering the internal area of the place or moving from one location to another. As a further example, if the processor wants the robotic device to remain distanced from obstacles the processor may use a low-resolution coordinate system. In some embodiments, the processor evaluates the performance of the robotic device in executing actions using different coordinate system resolutions. In embodiments, the processor uses a Markov Decision Process (MDP) consisting of a sequence of states and actions followed by rewards. Actions are taken to transition from one state to another and, after transitioning to each new state, the processor assigns a reward. For a sequence of states and actions, the processor calculates a net reward as the sum of rewards received for the sequence of states and actions, with future rewards discounted. The expected net reward for the execution of a sequence of states and actions is given by a state-action value function. The processor is configured to find the optimal state-action value function by identifying the sequence of states and actions, including coordinate system resolution to use in executing the actions, with highest net reward. Since multiple actions can be taken from each state, the goal of the processor is to also find an optimal policy that indicates the action, including coordinate system resolution to use in executing the action, from each state with the highest reward value. For example, if the robotic device is observed to bump into an obstacle while executing an action using a low-resolution coordinate system, the processor calculates a lower reward than when the robotic device completes the same action free of any collision using a high-resolution coordinate system, assuming collisions with obstacles reduces the reward achieved. If this is repeated over time, the processor eventually derives a policy to execute that particular action using a high-resolution coordinate system as it achieves higher reward. In embodiments, as the robotic device executes more actions using high- and low-resolution coordinate systems over time, data is gathered on the reward assigned to each state and action, the action including the coordinate system resolution used in executing the action. In embodiments, the processor compares the reward received for executing an action from one state to another using a high-resolution coordinate system and executing the same action using a low-resolution coordinate system. Over time the processor determines a policy that maximizes the net reward. In embodiments, the sequence of states and actions corresponds to the states visited and actions taken (including the resolution of the coordinate system used in completing each action) while, for example, executing a work session from start to finish. Over time, as more states are visited and different actions from each state are evaluated, the system will converge to find the most optimal action (including the resolution of the coordinate system used in completing each action) to take from each state thereby forming an optimal policy. Further, as different sequences of states and actions are evaluated over time, the system will converge to the most optimal sequence of states and actions. For example, consider the states visited and actions taken from each state while cleaning a room using a high and low-resolution coordinate system. If the robotic device has multiple encounters with obstacles and coverage time is increased while executing actions from different states during the cleaning session the processor calculates a lower net reward (assuming collisions and cleaning time are factors in determining the reward value) than when completing the cleaning session collision free using a high-resolution coordinate system. If this is continuously observed over time, the processor derives a policy to use a high-resolution coordinate system for the particular actions taken while cleaning the room. In this example, only two levels of coordinate system resolution are considered for illustrative purposes, however, the processor can consider a greater number of different resolution levels.

In some embodiments, the robotic device visits perimeters to check for accuracy of perimeter coordinates after covering a portion of or all internal areas. For example, a robotic device may execute a boustrophedon motion within internal areas of the place and then visit perimeters after. By visiting perimeters, it can be verified that the actual locations of perimeters coincide with coordinates identified as perimeter. For example, the location at which the robotic device observes contact with the perimeter using, for example, a tactile sensor or the location at which the robotic device observes the perimeter using a short-range IR sensor can be compared to perimeter coordinates in the map to check if they coincide with each other. In some embodiments, perimeters may be visited to check for accuracy before visiting all internal areas. For example, perimeters in a first room may be visited after coverage of internal areas in the first room and before coverage in a second room. Depending on the situation, the processor of the robotic device verifies the accuracy of perimeters at any time during or after the process of finding the perimeter of the place. In embodiments where a perimeter is predicted by the map but not detected, the processor assigns corresponding data points on the map a lower confidence and in some instances the area is re-mapped with the approach above in response. In some embodiments, mapping the perimeters of the place is complete after the robotic device has made contact with all perimeters and confirmed that the locations at which contact with each perimeter was made coincides with the locations of corresponding perimeters in the map. In some embodiments, a conservative coverage algorithm is executed to cover the internal areas of the place before the processor of the robotic device checks if the observed perimeters in the map coincide with the true perimeters of the place. This ensures more area is covered before the robotic device faces challenging areas such as obstacles. In some embodiments, the processor uses this method to establish ground truth by determining the difference between the location of the perimeter coordinate and the actual location of the perimeter. In some embodiments, the processor uses a separate map to keep track of new perimeters discovered, thereby creating another map. The processor may merge two maps using different methods, such as the intersection or union of two maps. For example, in some embodiments, the processor may apply the union of two maps to create an extended map of the place with areas that may have been undiscovered in the first map and/or the second map. In some embodiments, the processor creates a second map on top of a previously created map in a layered fashion, resulting in additional areas of the place that may have not been recognized in the original map. Such methods are used, for example, in cases where areas are separated by movable obstacles that may have prevented the image sensor and processor of the robotic device from determining the full map of the place and in some cases, completing an assigned task. For example, a soft curtain may act as a movable object that appears as a wall in a first map. In this case, the processor creates a second map on top of the previously created first map in a layered fashion to add areas to the original map that may have not been previously discovered. The processor of the robotic device then recognizes (e.g., determine) the area behind the curtain that may be important (e.g., warrant adjusting a route based on) in completing an assigned task.

In some embodiments, the processor uses overlapping coordinates to verify the accuracy of the identified perimeter. Assuming the frame rate of the image sensor is fast enough to capture more than one frame of data in the time it takes the robotic device to rotate the width of the frame, a portion of data captured within each field of view will overlap with a portion of data captured within the preceding field of view. In embodiments, the processor verifies accuracy of perimeter coordinates by assigning a vote (although other point systems can be used, such as providing a reward or assigning an arbitrary numerical value or symbol) to each coordinate identified as perimeter each time a depth estimated from data captured in a separate field of view translates to the same coordinate, thereby overlapping with it. In some embodiments, coordinates with increased number votes are considered to be more accurate. Multiple number of votes arise from multiple sets of data overlapping with one another and increase the accuracy in the predicted perimeter. In some embodiments, the processor ignores coordinates with a number of votes below a specified threshold.

In another embodiment, the processor uses overlapping depth estimates (or data from which depth is inferred) to verify the accuracy of the identified perimeter. In embodiments, the processor verifies accuracy of the predicted perimeter based on the number of overlapping depth estimates wherein increased number of overlapping depth estimates indicates higher accuracy in the predicted perimeter. In embodiments, the processor identifies overlapping depth estimates from two separate fields of view when a number of consecutive (e.g., adjacent) depth estimates from the first and second fields of view are equal or close in value. Although the value of overlapping estimated depths from the first and second fields of view may not be exactly the same, depths with similar values, to within a tolerance range of one another, can be identified (e.g., determined to correspond based on similarity of the values). Furthermore, the processor may identify matching patterns in the value of estimated depths within the first and second fields of view to identify overlapping depths. For example, a sudden increase then decrease in the depth values observed in both sets of estimated depths may be used to identify overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the depths, can also be used to identify overlap between the two sets of estimated depths. A Jacobian and Hessian matrix can be used to identify such similarities. In some embodiments, the processor uses a metric, such as the Szymkiewicz-Simpson coefficient, to indicate how good of an overlap there is between two sets of estimated depths. In some embodiments, the processor uses thresholding in identifying an area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest.

Or in some embodiments, the processor determines an overlap with a convolution. Some embodiments may implement a kernel function that determines an aggregate measure of differences (e.g., a root mean square value) between some or all of a collection of adjacent depth readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied.

In some embodiments, the processor uses down-res images to afford faster matching, e.g., by selecting every other, every fifth, or more or fewer vectors, or by averaging adjacent vectors to form two lower-resolution versions of the images to be aligned. The resulting alignment may then be applied to align the two higher resolution images.

In some instances, the processor uses the number of overlapping depth measurements from two separate fields of view to verify the angular rotation measured by a movement measuring device, such as a gyroscope, given that the angular increment between readings is known. Angular increments or angular resolution between readings may vary and may include, for example, 1 reading/degree, 1 reading/0.25 degrees, etc. The processor identifies overlapping depth measurements using the methods described above.

In some embodiments, there can be inconsistency between vector measurements from a first and second field of view, and hence estimated depths, to the same object in the place due to noise, such as measurement noise, and inaccuracy of calculation. This can result in adjacent coordinates representing the same perimeter of the place or the adjacent perimeter coordinates being staggered with some coordinates being closer to the center of the place than others. In some embodiments, the processor uses a conservative approach wherein the coordinates closer to the center of the place are chosen as the perimeter of the place. In another embodiment, the processor chooses the coordinates with greater number of votes (or assigned points or rewards, etc.) as the perimeter of the place. In yet another embodiment, the processor combines two or more sets of estimated depths to the same object(s) within the place to estimate new depths to the object. The processor identifies two or more sets of depth estimates as being estimated depths to the same object(s) within the place by identifying overlapping depth estimates from the two or more sets of depth estimates. In embodiments, the processor identifies overlapping depth estimates from two or more sets of depth estimates using methods such as those described above for identifying overlapping depth values from two sets of data. In embodiments, the processor combines two (or more) sets of overlapping depth estimates (or vector measurements or perimeter coordinates) using a moving average (or some other measure of central tendency may be applied, like a median or mode) and adopts them as the new depths for the area of overlap. The processor may also use minimum sum of errors to adjust and calculate depths to compensate for the lack of precision between overlapping depth estimates from the first and second fields of view. By way of further example, the processor may use minimum mean squared error to provide a more precise estimate of overlapping depths. The processor may also use other mathematical methods to further process overlapping depths, such as split and merge algorithm, incremental algorithm, Hough Transform, line regression, Random Sample Consensus, Expectation-Maximization algorithm, or curve fitting, for example. In another embodiment, the processor may use the k-nearest neighbors algorithm where each new depth is calculated as the average of the depth values of its k-nearest neighbors. These algorithms may be used alone or in combination. Multiple sets of overlapping depth estimates and their combination gives the robotic device a greater chance of staying within the perimeter of the place and avoiding contact with the perimeter.

In some embodiments, prior to measuring vectors within a new field of view, an adjustment range is calculated based on expected noise, such as measurement noise, robotic device movement noise, and the like. The adjustment range is applied with respect to depths estimated from the vectors measured within the previous field of view and is the range within which overlapping depth estimates from the new field of view are expected to fall within.

In another embodiment, a weight is assigned to each estimated depth. The value of the weight is determined based on various factors, such as quality of the reading, the estimated depth's position with respect to the adjustment range, the degree of similarity between depths estimated from vectors measured in separate fields of view, the weight of neighboring depths, or the number of neighboring depths with high weight. In some embodiments, depths with weights less than an amount (such as a predetermined or dynamically determined threshold amount) are ignored, as depths with higher weight are considered to be more accurate. In some embodiments, increased weight is given to overlapping depths with a greater number of overlapping depth estimates between the overlapping sets of depths. In some embodiments, the weight assigned to readings is proportional to the number of overlapping depth estimates between the overlapping sets of depths. For example, data points corresponding to a moving object captured in one or two frames overlapping with several other frames captured without the moving object are assigned a low weight as they likely do not fall within the adjustment range and are not consistent with data points collected in other overlapping frames and would likely be rejected for having low assigned weight.

In some embodiments, more than two consecutive fields of view overlap, resulting in more than two sets of estimated depths overlapping. This may happen when the amount of angular movement between consecutive fields of view is small, especially if the frame rate of the camera is fast such that several frames within which vector measurements are taken are captured while the robotic device makes small movements, or when the field of view of the camera is large or when the robotic device has slow angular speed and the frame rate of the camera is fast. Higher weight may be given to estimated depths overlapping with more than two sets of estimated depths, as increased number of overlapping sets of depths provide a more accurate ground truth. In some embodiments, the amount of weight assigned to estimated depths is proportional to the number of depths from other sets of data overlapping with it. Some embodiments may merge overlapping depths and establish a new set of depths for the overlapping depth estimates with a more accurate ground truth. The mathematical method used can be a moving average or a more complex method.

Some embodiments may implement DB-SCAN on estimated depths and related values like pixel intensity, e.g., in a vector space that includes both depths and pixel intensities corresponding to those depths, to determine a plurality of clusters, each corresponding to estimated depth to the same feature of an object. Some embodiments may execute a density-based clustering algorithm, like DB-SCAN, to establish groups corresponding to the resulting clusters and exclude outliers. To cluster according to depth vectors and related values like intensity, in some embodiments, the processor of the robotic device may iterate through each of the depth vectors and designate a depth vector as a core depth vector if at least a threshold number of the other depth vectors are within a threshold distance in the vector space (which may be higher than three dimensional in cases where pixel intensity is included). Some embodiments may then iterate through each of the core depth vectors and create a graph of reachable depth vectors. In such embodiments, nodes on the graph are identified in response to non-core corresponding depth vectors within a threshold distance of a core depth vector on the graph and in response to core depth vectors on the graph being reachable by other core depth vectors on the graph. Two depth vectors may be reachable from one another if there is a path from one depth vector to the other depth vector, where every link and the path is a core depth vector and within a threshold distance of one another. The set of nodes in each resulting graph, in some embodiments, may be designated as a cluster, and points excluded from the graphs may be designated as outliers that do not correspond to clusters. In some embodiments, the processor may then determine the centroid of each cluster in the spatial dimensions of an output depth vector for constructing perimeter maps. In some cases, all neighbors have equal weight and in other cases the weight of each neighbor depends on its distance from the depth considered and/or similarity of pixel intensity values.

In some instances, the processor uses a modified RANSAC approach on two or more sets of depth data or two or more sets of movement data or other type of data. The processor connects any two points, one from each data set, by a line. A boundary is defined with respect to either side of the line. Any points from either data set beyond the boundary are considered outliers and are excluded. The process is repeated using another two points. In some embodiments, the process removes outliers to achieve a higher probability of being true. For example, in an extreme case depth to objects is measured and a moving object is captured in two frames overlapping with several frames captured without the moving object. The approach described or RANSAC method may be used to reject data points corresponding to the moving object. This method or a RANSAC method may be used independently or in combination with other processing methods.

In some embodiments, the accuracy of a perimeter coordinate depends on, for example, the quality of the image sensor, degree of similarity between overlapping coordinates taken from separate fields of view, the accuracy of neighboring coordinates, and the number of neighboring coordinates with high accuracy. Other factors may also have influence on the accuracy of a perimeter coordinate.

In some embodiments, the processor uses coordinates corresponding with internal areas for path planning. For example, the processor can consecutively order coordinates corresponding with internal areas such that the movement path of the robotic device follows along coordinates in an ordered manner. As new coordinates correspond with newly discovered internal areas, the processor updates the movement path of the robotic device such that the newly discovered internal areas are covered.

In some embodiments, the processor segments the internal area within which the robotic device performs work into smaller areas that may be covered by the robotic device. In some embodiments, the processor sets an order of coverage for the segmented areas, for example, beginning with the closest segmented areas and ending with the furthest segmented areas. In some embodiments, areas marked as covered by the processor of the robotic device are covered again depending on the path of the robotic device, user settings, and the coverage algorithm used. In some embodiments, the processor of the robotic device determines the entire perimeter of the place before performing work within internal areas. In some embodiments, the processor of the robotic device determines the entire perimeter of the place at the beginning of each work session. In other embodiments, the processor of the robotic device determines the entire perimeter of the place during a first work session and, in some embodiments, the processor of the robotic device makes incremental changes to the perimeter map. In some embodiments, the processor identifies a gap in the perimeter coordinates. In some instances, wherein the gap is an opening in the wall connecting two rooms, the processor uses the opening in the wall to separate the internal areas of the place into smaller subareas where each subarea may be treated independently. In embodiments, the processor actuates the robotic device to operate and execute tasks within each subarea independently. In some instances, the processor assigns each subarea a unique tag that is used in setting and controlling the operation and execution of tasks within each subarea. For example, and not by way of a limitation, In some embodiments, the area may be divided in to a number of subareas, such as three subareas, wherein the robotic device is actuated to execute cleaning in subarea 1 on Monday and Thursday mornings, execute cleaning in subarea 2 on Fridays, and remain out of subarea 3 at all times. The processor may also use the tags to set the order of coverage of each subarea. For example, if the internal areas of the entire place are to be cleaned, the processor may actuate the robotic device to clean subarea 2, 3 then 1. In embodiments, the processor actuates the robotic device by sending one or more signals to an actuator of the robotic device. In some embodiments, an application of a communication device with graphical user interface is used to segment the internal areas of the place into subareas, order the subareas for coverage and/or set execution of tasks within each subarea. The information is transmitted from the application of the communication device to the processor of the robotic device using wireless signal such as Bluetooth or Wi-Fi. In other embodiments, a user interface on the robotic device, a remote control, a web application, or other communication device paired with the robotic device may be used. An example of a graphical user interface can be found in U.S. patent application Ser. No. 15/949,708, the entire contents of which are hereby incorporated by reference. An example of a method for pairing a robotic device with an application of a communication device is described in U.S. patent application Ser. No. 16/109,617, the entire contents of which are hereby incorporated by reference.

In some embodiments, the processor of the robotic device is capable of recognizing an area, such as a room, that has already been visited by the robotic device. In some embodiments, the processor of the robotic device receives a command to skip coverage of the current area, such as a room, by, for example, activating a button on a user interface of the robotic device or by an application of a communication device paired with the robotic device. The area may or may not have been previously visited. An example of a method for recognizing an area that has already been visited by the robotic device and for skipping coverage of an area by a robotic device is described in U.S. Patent Application No. 62/740,558, filed Oct. 3, 2018, the entire contents of which are hereby incorporated by reference. In some embodiments, the processor of the robotic device fails to localize the robotic device and is unaware of its current location. In such instances, the processor resets localization and mapping and begins creating a new map, visiting each area (or room) for mapping, beginning with the room in which localization was lost. Since localization was lost, the processor is unaware of the initial starting point (i.e., the location of the docking station) to which it is to return after completing a work session. In such embodiments, after completing the work session the robotic device visits each area (or room) of the environment and rotates 360 degrees until a receiver of the robotic device detects an IR light emitted by a transmitter of the docking station signaling the robotic device to return to its initial starting position (i.e., the docking station). An example of a method for finding the starting point of a robotic device after localization of the robotic device is lost is also described in U.S. Patent Application No. 62/740,558, filed Oct. 3, 2018, the entirely of which is incorporated herein by reference.

In some embodiments, the robotic device is configured with a first exteroceptive sensor (e.g., depth sensor) and a second proprioceptive sensor (e.g., gyroscope, such as in a three or six axis inertial measurement unit (IMU)), the data of which the processor uses simultaneously and interchangeably for mapping and localization of the robotic device. In some embodiments, data from one sensor is used in a primary method for mapping and localization while data from the other sensor is used in a secondary method for mapping and localization. The processor uses the secondary method for mapping and localization when, for example, the sensor used in the primary method for mapping and localization malfunctions, becomes unusable or is functionally affected by the environment. For example, in direct sunlight a first exteroceptive sensor, such as a depth camera, may not provide the reliable readings required for a primary method for mapping and localization. In such instances, the processor uses a secondary method for mapping and localization using data from a second proprioceptive sensor, such as a gyroscope, to localize the robot and mark the area covered by the robotic device such that repeat coverage is avoided. The transition between the primary and secondary method may be seamless (e.g., occurring within less than 10 seconds, less than 1 second, or less than 500 milliseconds, and resulting in less than 1 cm, 10 cm, or 50 cm of error in position over 10 seconds of travel) and may be controlled with a finite state machine. In some embodiments, the processor uses the secondary method to verify output of the primary method. In some embodiments, one sensor is active (e.g., depth sensor emitting light to the environment and measuring reflected light) and the other sensor is passive (e.g., gyroscope measuring movement). For example, data from a digital camera (i.e., passive sensor) is used in a primary method for mapping and localization and data from a wheel encoder (i.e., active sensor) is used in a secondary method for mapping and localization.

In some embodiments, IMU measurements in a multi-channel stream indicative of acceleration along three or six axes may be integrated over time to infer a change in pose of the robot, e.g., with a Kalman filter. In some cases, the change in pose may be expressed as a movement vector in the frame of reference of the room through which the robot moves. Some embodiments may localize the robot or map the room based on this movement vector (and contact sensors in some cases) even if the image sensor is inoperative or degraded. In some cases, IMU measurements may be combined with image-based (or other exteroceptive) mapping data in a map or localization determination, e.g., with techniques like those described in Chen et. al "Real-time 3D mapping using a 2D laser scanner and IMU-aided visual SLAM," 2017 IEEE International Conference on Real-time Computing and Robotics (RCAR), DOI: 10.1109/RCAR.2017.8311877, or in Ye et. al, LiDAR and Inertial Fusion for Pose Estimation by Non-linear Optimization, arXiv:1710.07104 [cs.RO], the contents of each of which are hereby incorporated by reference. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

In some embodiments, the robotic device is configured with high (e.g., more than 1 megapixel, or more than 10 megapixel) resolution sensors, the data of which the processor uses to locally enhance observed perimeters. For example, a robotic device may be configured with a long-range, low-resolution depth camera and a short-range (e.g., 50 cm), high-resolution TOF sensor. The processor may use the TOF sensor to locally discover perimeters. In embodiments, the processor combines locally discovered perimeters with globally discovered perimeters. In some embodiments, the robotic device visits perimeters discovered after a first mapping session to observe the perimeters using higher resolution sensors. In some embodiments, discovery of perimeters is executed offline and saved in a memory of the robotic device or online wherein the perimeter map is saved to, for example, the cloud. In some embodiments, the perimeter map is updated online in an incremental manner.

In some embodiments, the map of the place is modified and/or updated by, for example, creating, modifying, or deleting perimeters, and/or obstacles, creating zones, assigning coverage of zones, assigning different actions to different zones, etc. using, for example, a graphical user interface of an application of a communication device paired with the robotic device. An example of a graphical user interface is described in U.S. patent application Ser. Nos. 15/949,708, 15/272,752, and 62/661,802, 62/631,050, the entirety of the contents of each of which are incorporated herein by reference wherein the graphical user interface may be used to choose and modify robot settings, robot operations, maps of the robot, actions of the robot, etc. In some embodiments, the perimeter map accessed for modification and/or updating is encrypted using a Public Key Infrastructure wherein a private key and digital signature is required to access the perimeter map. In embodiments, the information is encrypted with a public key to protect against intercept.

In some embodiments, the processor uses captured sensor data of objects, such as walls or furniture, within the surrounding environment to update the location of the robotic device within the perimeter map such that the processor is aware of the position of the robotic device relative to perimeters and objects within the environment as it operates. As the robotic device moves within the environment and sensors capture data, the processor tracks the position of the robotic device relative to observed objects within the environment by associating newly captured data of objects with previously captured data of objects. Prior to associating newly captured sensor data of objects with previously captured sensor data of objects, the processor updates the estimated position of previously captured objects relative to the robotic device based on the most recent state of the objects and the motion model of the robotic device. In some embodiments, the processor associates new sensor data with previously captured sensor data of different objects within the environment by defining acceptance gates around current estimated positions of previously captured objects. The newly captured sensor data that falls within an acceptance gate of an object and is closest to the updated estimated position of the object is associated with the corresponding previously captured sensor data of the object. However, over time, as the robotic device moves around the environment and observes more objects and collects more sensor data, determining to which previously captured object newly captured sensor data is associated to becomes increasingly challenging. In such instances, the processor uses a probabilistic data association filter (PDAF) to associate newly captured sensor data with previously captured sensor data of observed objects within the environment. The PDAF considers all sensor data falling within the acceptance gate, wherein instead of updating the position of an object based on a single best matched observation, the PDAF updates based on all observations falling within the gating window, weighted by their likelihoods. In some embodiments, the PDAF accounts for the statistical distribution of sensor data errors and clutter and assumes that only one of the candidate observations within the gating window is a match, and the rest are false alarms. In other embodiments, the processor uses other methods for tracking the location of the robotic device within the perimeter map of the place during mapping and/or operation. For example, In some embodiments the processor uses scan matching techniques wherein the optimization algorithms, such as Gauss-Newton or Levenberg-Marquardt, are used to find the best match between scans by minimizing the error between the data of the scans.

In some embodiments, prior to beginning the mapping process the processor of the robotic device estimates its position. The robotic device rotates 360 degrees while scanning the room using a device capable of measuring depth or data from which depth can be inferred. The processor chooses a subset of scans from the total number of scans obtained during the 360 degree scan and creates an initial low resolution map of the environment. A low-resolution map is created intentionally due to uncertainties in the position of the robotic device and the surroundings. For example, the true rotation of the robotic device may not actually be exactly 360 degrees or the robotic device may not actually rotate exactly in place resulting in uncertainties in position. In some embodiments, the robotic device rotates greater than 360 degrees, such as 450 or 540 degrees, etc. The processor confirms that a full rotation was completed by identifying an overlap between a portion of the scanned data. In some embodiments, the robotic device continues to rotate until the processor identifies overlapping data from two different scans. In some embodiments, the processor discards all or a portion of the overlapping data. Alternatively, the processor can confirm a full rotation by the robotic device using movement data measured by, for example, a gyroscope. In other embodiments, a charging station emits a signal received by the robotic device in an initial starting position. Once the robotic device has rotated 360 degrees it receives the signal again, indicating a full rotation. Alternatively, the robotic device emits a signal in an initial starting position received by the charging station. Once the robotic device has rotated 360 degrees, the charging station receives the signal again, indicating a full rotation and notifies the processor using wireless communication. In some embodiments, the robotic device executes other movements, such as square, spiral, and boustrophedon, etc., to capture scans of the entire area while using a movement measurement device to measure movement of the robotic device. Initially, the processor assumes the robotic device is located somewhere within an area greater than the size of the robotic device, the location being the seed location of the robotic device. This is due to initial uncertainty in the position of the robotic device and the surroundings as described in the examples above. As more data is collected and the processor is more certain of the position of the robotic device and its surroundings, the processor reduces the size of the area within which the robotic device is assumed to be located. On the other hand, as the robotic device moves and noise, such as noise in movement, is introduced, the processor increases the area within which the robotic device is assumed to be located. In embodiments, for each possible location of the robotic device within the area, the processor assigns a likelihood of the robotic device being located at each particular location within the area. The processor adjusts the shape of the area within which the robotic device is assumed to be located within based on deviation in measured and true heading and translation as the robotic device moves. In some embodiments, the processor uses information on linear and angular undershoot and overshoot to help determine the shape of the area. In some embodiments, the processor uses a statistical ensemble comprising a large collection of virtual, independent copies of the robotic device in various states (locations) of the phase space (the environment) to determine a phase space probability distribution over all possible states of the robotic device, indicating the most likely location of the robotic device. Further details of this method for mapping and localization and other examples of methods for localizing the robotic device are described in U.S. Patent Application 62/746,688, 62/740,573, and 62/740,580, the entire contents of which are hereby incorporated by reference.

In some embodiments, the processor uses a differential equation to model the motion of the robotic device. The processor solves the equation to determine the position of the robotic device while mapping and/or operating within the place. In some embodiments, the processor solves the differential equation using the explicit Euler method and in other embodiments, using the explicit midpoint method.

In different embodiments, the resulting perimeter map may be encoded in various forms. For instance, some embodiments may construct a point cloud of two dimensional or three dimensional points by transforming each of the vectors into a vector space with a shared origin, e.g., based on the above-described displacement vectors, in some cases with displacement vectors refined based on measured depths. Or some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when mapping. Vectors need not be labeled as "vectors" in program code to constitute vectors, which is not to suggest that other mathematical constructs are so limited. In some embodiments, vectors may be encoded as tuples of scalars, as entries in a relational database, as attributes of an object, etc. Similarly, it should be emphasized that images need not be displayed or explicitly labeled as such to constitute images. Moreover, sensors may undergo some movement while capturing a given image, and the "pose" of a sensor corresponding to a depth image may, in some cases, be a range of poses over which the depth image is captured.

In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats.

In embodiments, the processor of the robotic device may, for example, use the perimeter map to autonomously navigate the place during operation, e.g., accessing the perimeter map to determine that a candidate route is blocked by an obstacle denoted in the perimeter map, to select a route with a route-finding algorithm from a current point to a target point, or the like. In some embodiments, the perimeter map is stored in memory for future use. Storage of the perimeter map may be in temporary memory such that a stored perimeter map is only available during an operational session or in more permanent forms of memory such that the perimeter map is available at the next session or startup. In some embodiments, the perimeter map is further processed to identify rooms and other segments. In some embodiments, a new perimeter map is constructed at each use, or an extant perimeter map is updated based on newly acquired data.

Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classifying objects in a field of view as being moveable objects upon detecting a difference of greater than a threshold size.

In some instances where linear algebra is used, Basic Linear Algebra Subprograms (BLAS) may be implemented to carry out operations such as vector addition, vector norms, scalar multiplication, matrix multiplication, matric transpose, matrix-vector multiplication, linear combinations, dot products, cross products, and the like.

In other embodiments, other types of devices capable of measuring depth or acquiring data from which depth can be inferred may be used to estimate depths. Structure of data that may be used in estimating or inferring depths may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth may be inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. The methods of perceiving or otherwise inferring depths and the formats of reporting depths used herein are for illustrative purposes and are not intended to limit the invention, again which is not to suggest that other descriptions are limiting. Depths may be perceived (e.g., measured or otherwise inferred) in any form and be reported in any format. For example, in some embodiments, depths may be inferred based on the time required for a light to reflect off of the object and return. In a further example, depth to objects may be inferred using the quality of pixels, such as brightness, intensity, and color, in captured images of the objects, and in some cases, parallax and scaling differences between images captured at different image sensor poses. It is noted that each step taken in the process of transforming a matrix of pixels, for example, each having a tensor of color, intensity and brightness, into a depth value in millimeters or inches is a loss and computationally expensive compression and further reduces the state space in each step when digitizing each quality. In order to reduce the loss and computational expenses, it is usually desired and useful to omit intermediary steps if the goal can be accomplished without them. Based on information theory principal, it is generally beneficial to increase content for a given number of bits. For example, reporting depth in specific formats, such as metric units, is only necessary for human visualization. In implementation, such steps can be avoided to save computational expense and loss of information (although that is not to say that such steps must be eliminated or that the methods and techniques described herein cannot be implemented otherwise). The amount of compression and the amount of information captured and processed is a trade-off, which a person of ordinary skill in the art can balance to get the desired result with the benefit of this disclosure.

The angular resolution of estimated depths is varied in different implementations but generally depends on the image sensor resolution, the illuminating light, and the processing power for processing the output. For example, if the illuminating light generates distinctive dots very close to one another, the resolution of the device is improved. The algorithm used in generating the vector measurement from the illuminated pixels in the image sensor also has an impact on the overall angular resolution of the readings. In some embodiments, readings are taken in one-degree, five-degree, fifteen-degree, or other increments. In other embodiments, other incremental degrees may be used depending on the application and how much resolution is needed for the specific task or depending on the robotic device and the environment it is running in. For robotic devices used within consumer homes, for example, a low-cost, low-resolution image sensor generally generate enough resolution. For different applications, image sensors with different higher or lower resolutions can be used. In some image sensors, for example, a vector reading from the camera to an object in the surroundings is provided for each angular resolution in the field of view.

The processor of the robotic device may include, but is not limited to, a system or device(s) that perform, for example, methods for receiving data, stored data, methods for processing data, command responses to received, stored or processed data, to the observed environment, to internal observation, or to user input, methods for constructing a map or the boundary of an environment, navigation, and operation modes. For example, the processor may receive data from a tactile sensor or user input, and, based on the data received, the processor may respond by commanding the robotic device to move in a specific direction. As a further example, the processor may receive image or other data of the observed environment, process the data, and use it to create a map of the environment. The processor may be a part of the robotic device, the camera, a navigation system, a mapping module or any other device or module. The processor may also comprise a separate component coupled to the robotic device, the navigation system, the mapping module, the camera, or other devices working in conjunction with the robotic device. More than one processor may be used.

In some embodiments, all data is processed on the robotic device, including by its various component parts, such as the processor. In other embodiments, at least some data is processed on at least one separate device, such as a docking station of the robotic device or on the cloud.

In some embodiments, more than one device capable of measuring depth or capturing data from which depth may be inferred may be used to improve accuracy of the perimeter map constructed. For example, a plurality of image sensors may be used simultaneously where each consecutive image sensor reading is used to more accurately build a perimeter map of the place. The use of a plurality of image sensors allows for the collection of depth estimates from different perspectives and angles, for example. Where more than one image sensor is used, triangulation or other suitable methods may be used for further data refinement and accuracy.

In the following illustrations the coordinates defining the perimeter and/or internal areas of the place are represented visually in a grid map for illustrative purposes, however, the perimeter map of the place may be represented in other suitable forms as described above. The invention is not to be limited to any type of imaging device or depth measuring device or any type of approach or method used for perceiving, measuring, inferring, determining, or calculating depth, which is not to suggest that any other description herein is limiting. The devices and methods used herein are for illustrative purposes.

Figure 1B:
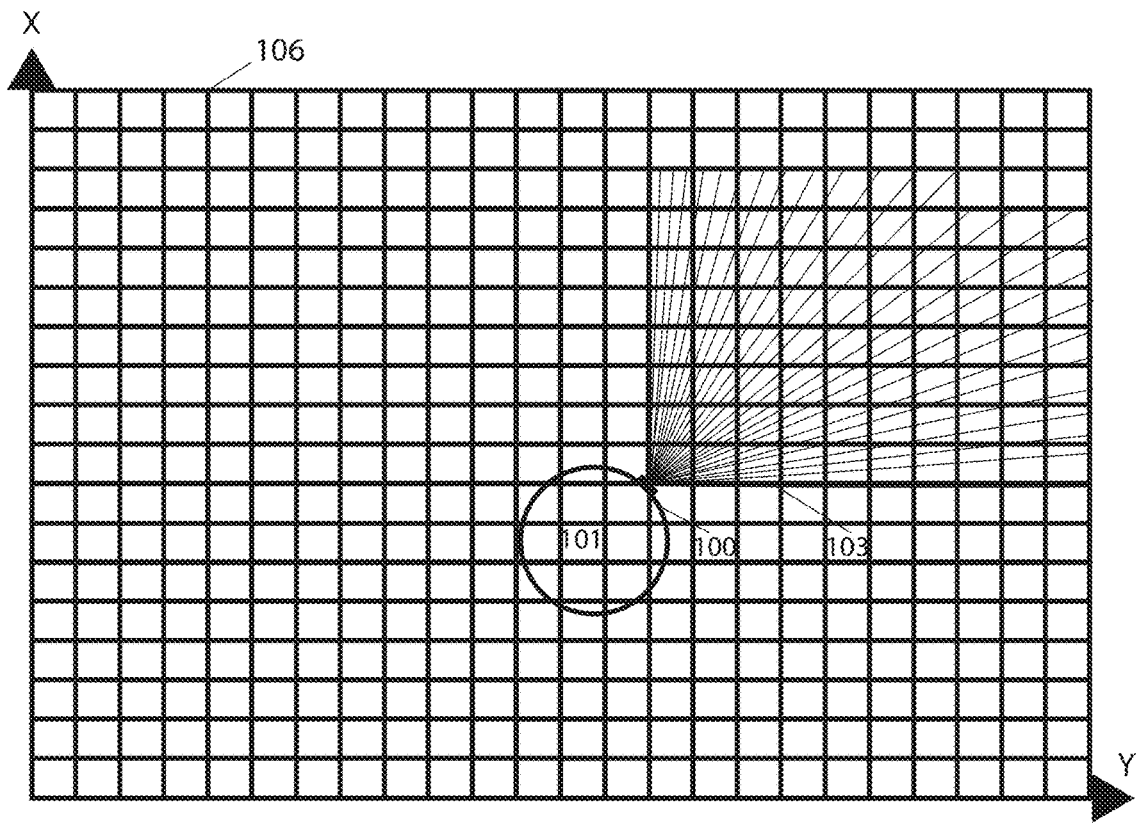
FIG. 1B illustrates coordinates coinciding with depth vector measurements taken within the first field of view, as provided in some embodiments.
Figure 1C:
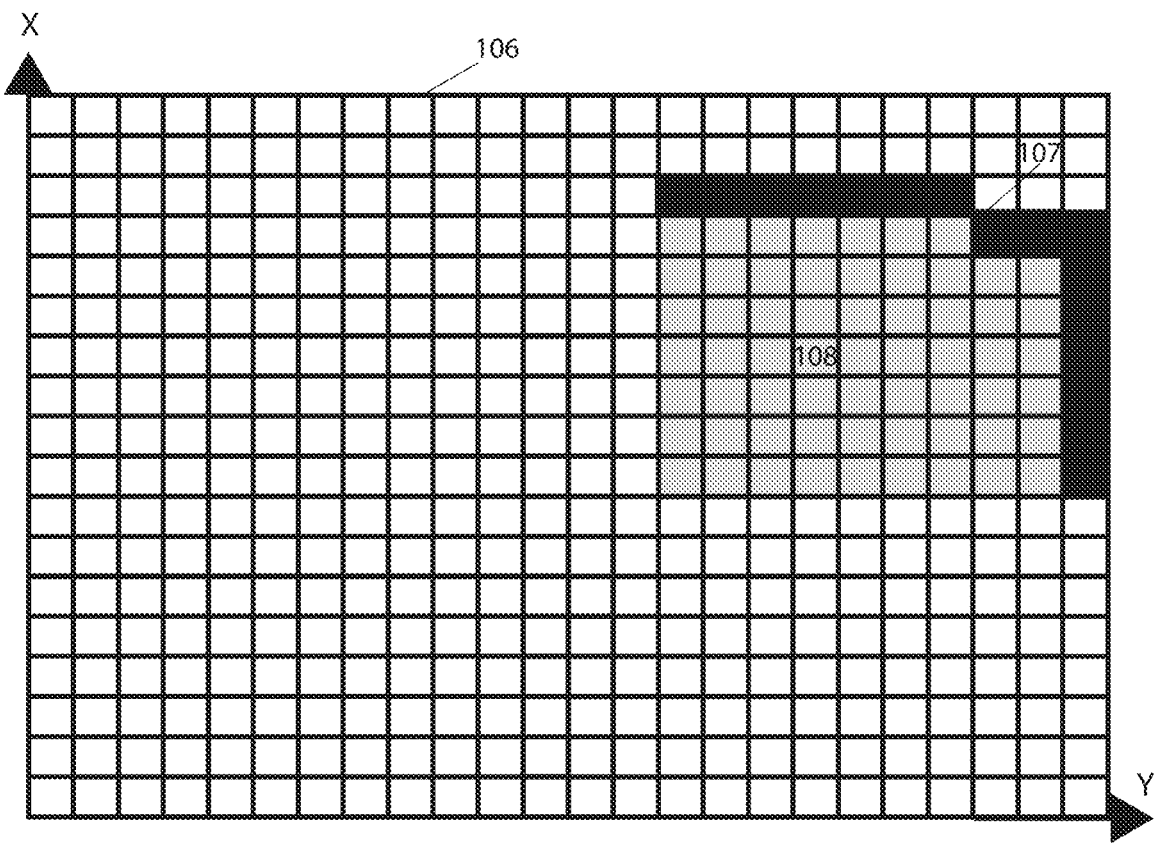
FIG. 1C illustrates coordinates marked as perimeter and internal area corresponding to depth vector measurements taken within the first field of view, as provided in some embodiments.
Figure 1D:
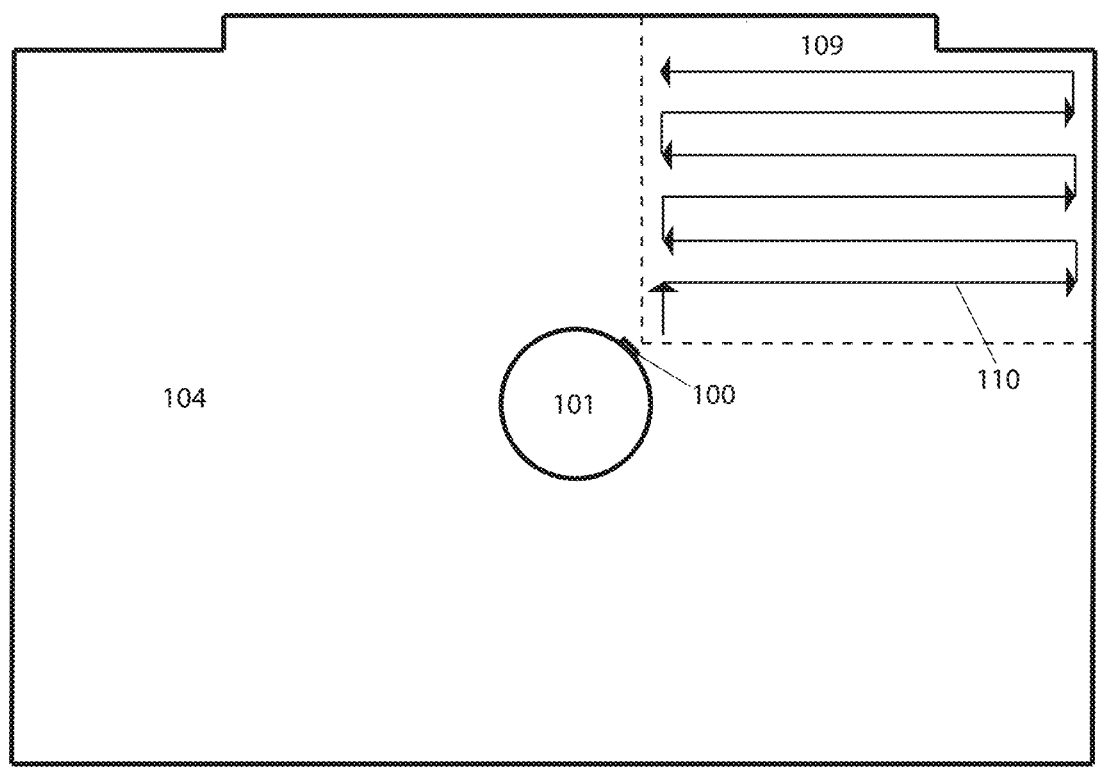
FIG. 1D illustrates a movement path of a robotic device within marked internal area of the place, as provided in some embodiments.

FIG. 1A illustrates an embodiment of the present invention where image sensor 100 mounted on robotic device 101 measures depth vectors 102 within a first field of view 103 of place 104. Image sensor 100 may, for example, be a LIDAR, LADAR, ultrasonic, camera, sonar, laser, or stereo depth measurement device or any other device or system capable of measuring depths or capturing data from which depth may be inferred. In some embodiments image sensor 100 is coupled with at least one laser emitter. A processor of robotic device 101 uses depth vectors to calculate the L2 norm and hence estimate depth from image sensor 100 to object 105. Referring to FIG. 1B, the processor translates estimated depths from depth vectors 102 taken within first field of view 103 into Cartesian coordinates corresponding to coordinate system 106 observed by image sensor 100 mounted on robotic device 101, wherein each coordinate represents a different location within place 104. To translate a depth estimate into a Cartesian coordinate, the processor iteratively checks each coordinate within coordinate system 106 observed by image sensor 100 until the coordinate coinciding with the depth estimate is identified. The coordinate with which the depth estimate coincides is identified as a perimeter of the place. In FIG. 1B, for example, a visual representation of coordinate system 106 observed by image sensor 100 is shown, whereby each coordinate corresponds to a cell representing a specific location within the environment. The coordinate cells coinciding with depth estimated from depth vectors 102 are the cells at which the depth vectors 102 terminate. All coordinates bound between perimeter coordinates and the limits of field of view 103 of image sensor 100 are treated as internal area. Referring to FIG. 1C, translated coordinates 107 are identified as perimeter, corresponding to depths estimated from depth vectors 102 measured within field of view 103. In this example, perimeter coordinates and internal area are shown visually in a grid, however, perimeter coordinates 107 could simply be stored in a matrix or finite ordered list. In this example, coordinates 107 identified as perimeter are colored black while coordinates between perimeter coordinates 107 and the limits of field of view 103 treated as internal area 108 are colored grey. Robotic device 101 begins to perform work within area 109 of place 104, corresponding to internal area 108 within coordinate system 106 observed by image sensor 100, following along movement path 110. The movement path shown is for illustrative purposes and may be structured differently.

Figure 2A:
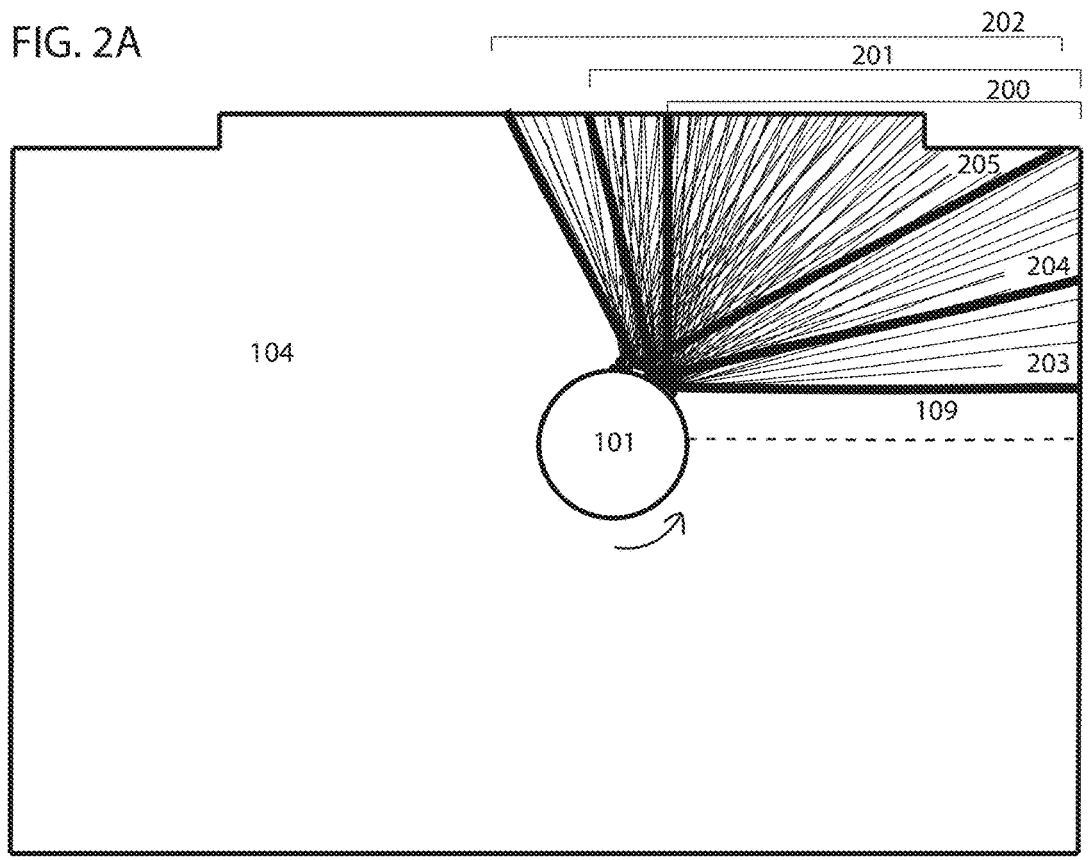
FIG. 2A illustrates depth vector measurements taken within multiple overlapping consecutive fields of view, as provided in some embodiments.
Figure 2B:
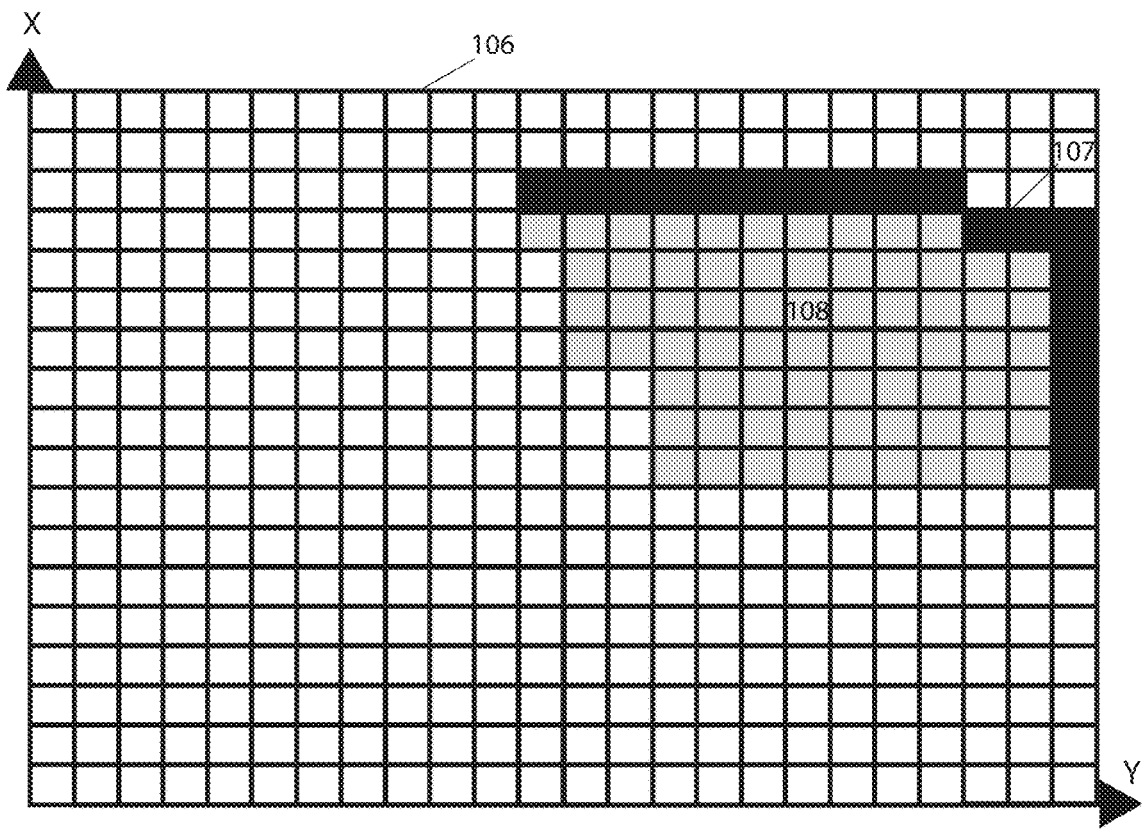
FIG. 2B illustrates an updated coordinate system with coordinates newly marked as perimeter and internal area corresponding to depth vector measurements taken within the multiple fields of view, as provided in some embodiments.
Figure 2C:
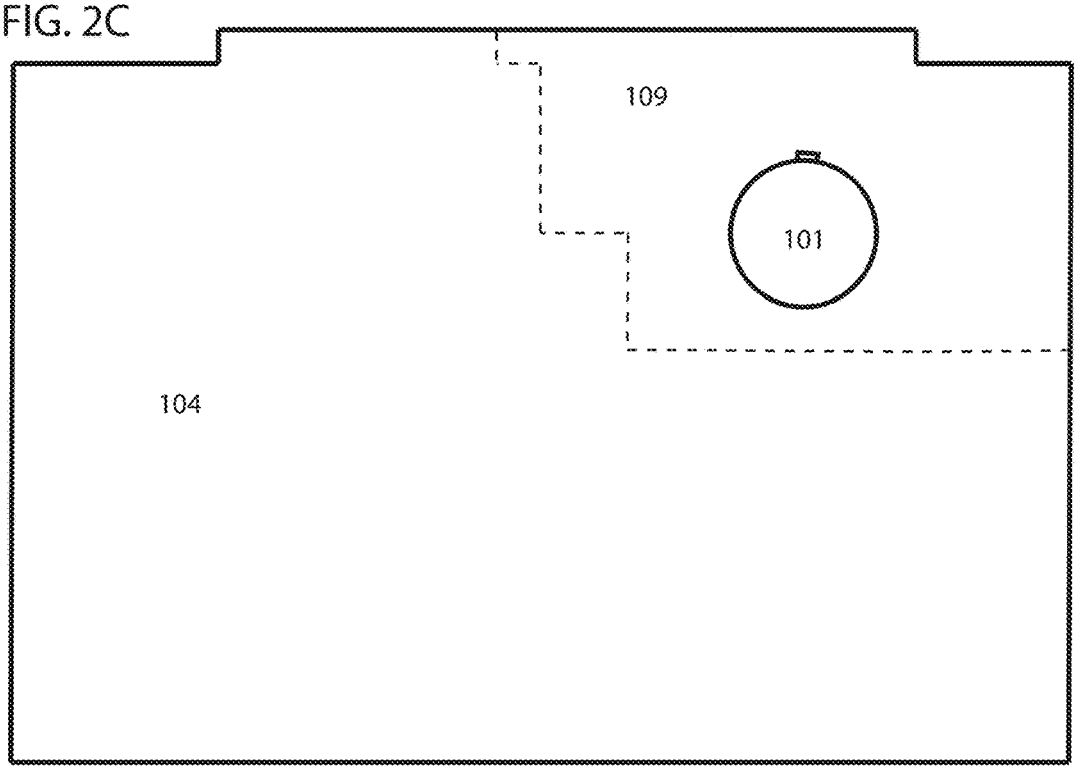
FIG. 2C illustrates an updated movement path of a robotic device within an expanded marked internal area of the place, as provided in some embodiments.

As robotic device 101 translates and rotates while performing work within internal area 109, image sensor 100 continuously measures vectors within successive fields of view. After capturing depth vectors within each new fields of view, the processor estimates depths corresponding to the depth vectors and translates depth estimates into Cartesian coordinates. The processor identifies Cartesian coordinates corresponding to depth estimates as perimeter and coordinates bounded between perimeter coordinates and limits of the field of view as internal area, alongside previously identified perimeter coordinates and internal area. The perimeter and internal area are therefore expanded with each new set of depth vector measurements. FIG. 2A, for example, illustrates image sensor 100 mounted on robotic device 101 rotating in a counterclockwise direction while taking depth vector measurements 200, 201, and 202 within fields of view 203, 204, and 205, respectively, as robotic device 101 moves to begin performing work within area 109 of place 104, corresponding to identified internal area 108. As each set of depth vector measurements 200, 201, and 202 are successively taken within fields of view 203, 204, and 205, respectively, the processor estimates corresponding depths and translates estimated depths into coordinates, identifying translated coordinates as perimeter and coordinates bound between perimeter and the limits of the fields of view as internal area. With each new set of depth vector measurements 102, 200, 201, and 202, identified perimeters and internal area expands. FIG. 2B demonstrates expanded perimeter 107 and internal area 108 from depth vector measurements 102, 200, 201, and 202, as compared to FIG. 1C resulting from single set of depth vector measurements 102. FIG. 2C demonstrates area 109 within place 104, within which robotic device 101 performs work, corresponding to expanded internal area 108. As internal area 108 within which robotic device 101 performs work expands, robotic device 101 is able to explore further limits and discover new perimeters and internal areas of place 104. Robotic device 101 continues to perform work within the continuously expanding area 109 while imaging sensor 100 measures new depth vectors and the processor estimates corresponding depths and translates estimated depths to coordinates, identifying translated coordinates as perimeter of place 104.

Figure 3:
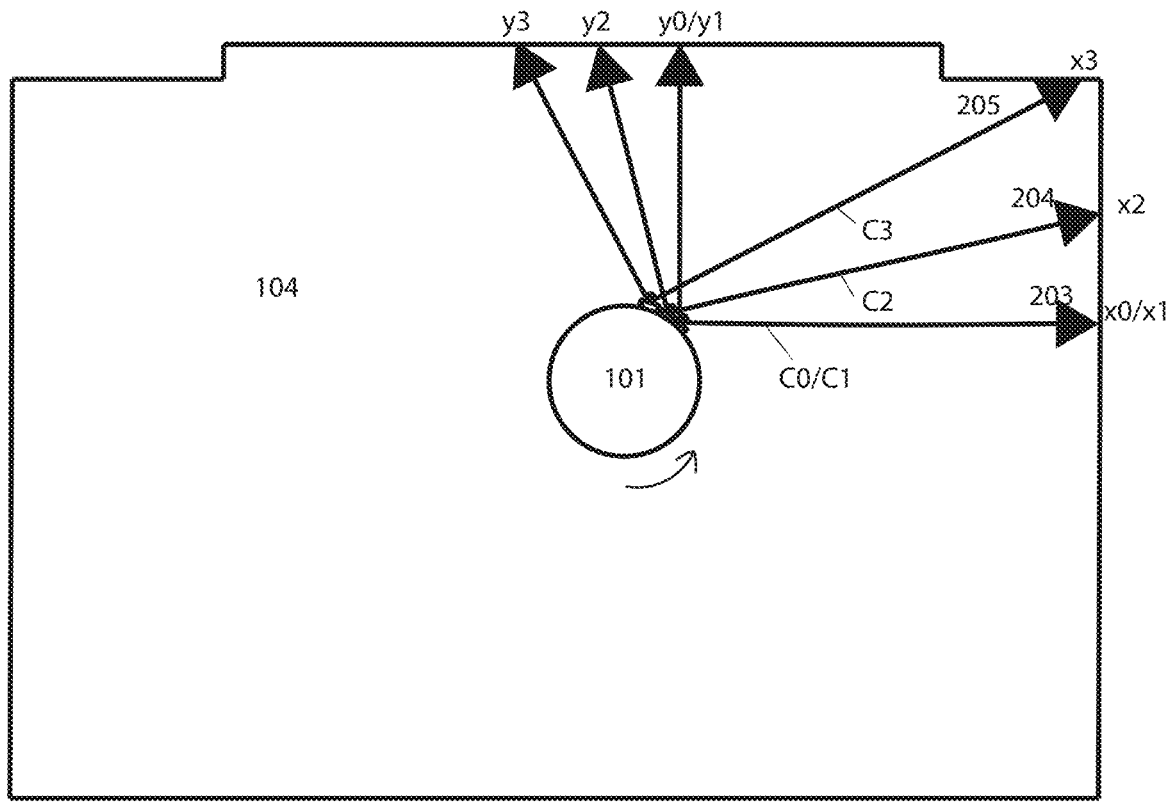
FIG. 3 illustrates a coordinate system observed by an image sensor of a robotic device as it moves within a place, as provided in some embodiments.

Prior to measuring depth vectors within each new field of view, the processor adjusts previous coordinates to account for the measured movement of image sensor 100 as it moves from observing one field of view to the next with movement of robotic device 101. This adjustment accounts for the movement of the coordinate system observed by the image sensor 100 with respect to a stationary coordinate system. As robotic device 101 moves to observe a new field of view, the observed coordinate system of the mounted image sensor 100, within which coordinates are identified as perimeter, moves with respect to the stationary coordinate system as image sensor 100 is fixed to robotic device 101. By measuring the movement of robotic device 101, and hence mounted image sensor 100 observing new fields of view with corresponding new observed coordinate systems, the processor can store movement in a movement vector and use it to transform all perimeter coordinates to correspond to, for example, the initial coordinate system observed by image sensor 100 coinciding with the stationary coordinate system. For example, stationary Cartesian coordinate system C0 with x0, y0 axes is shown in FIG. 3. The first set of depth vectors captured within field of view 203 by image sensor 100 are translated to perimeter coordinates corresponding to coordinate system C1 with x1, y1 axes observed by image sensor 100 and also corresponding to stationary coordinate system C0. As robotic device 101 moves within place 104, image sensor 100 observes field of view 204 and corresponding new coordinate system C2 to which perimeter coordinates corresponding to depth vector measurements taken within field of view 203 correspond to. When observing third field of view 205, yet another new coordinate system C3 is observed by image sensor 100. In order to relate all perimeter coordinates identified in separate coordinate systems C1, C2, and C3, the processor stores the measured movement of robotic device 101 with mounted image sensor 100 with respect to stationary coordinate system C0 in a movement vector V with values (x, y, theta). The processor uses the movement vector V to transform perimeter coordinates corresponding to coordinate systems C1, C2, and C3 into a single coordinate system C0 and, thus, form the perimeter of place 104. Movement is measured by, for example, a gyroscope and odometer of robotic device 101. The processor combines the movement measured by the gyroscope and odometer using methods described above to obtain a more accurate estimate of the movement of robotic device 101.

Figure 2D:
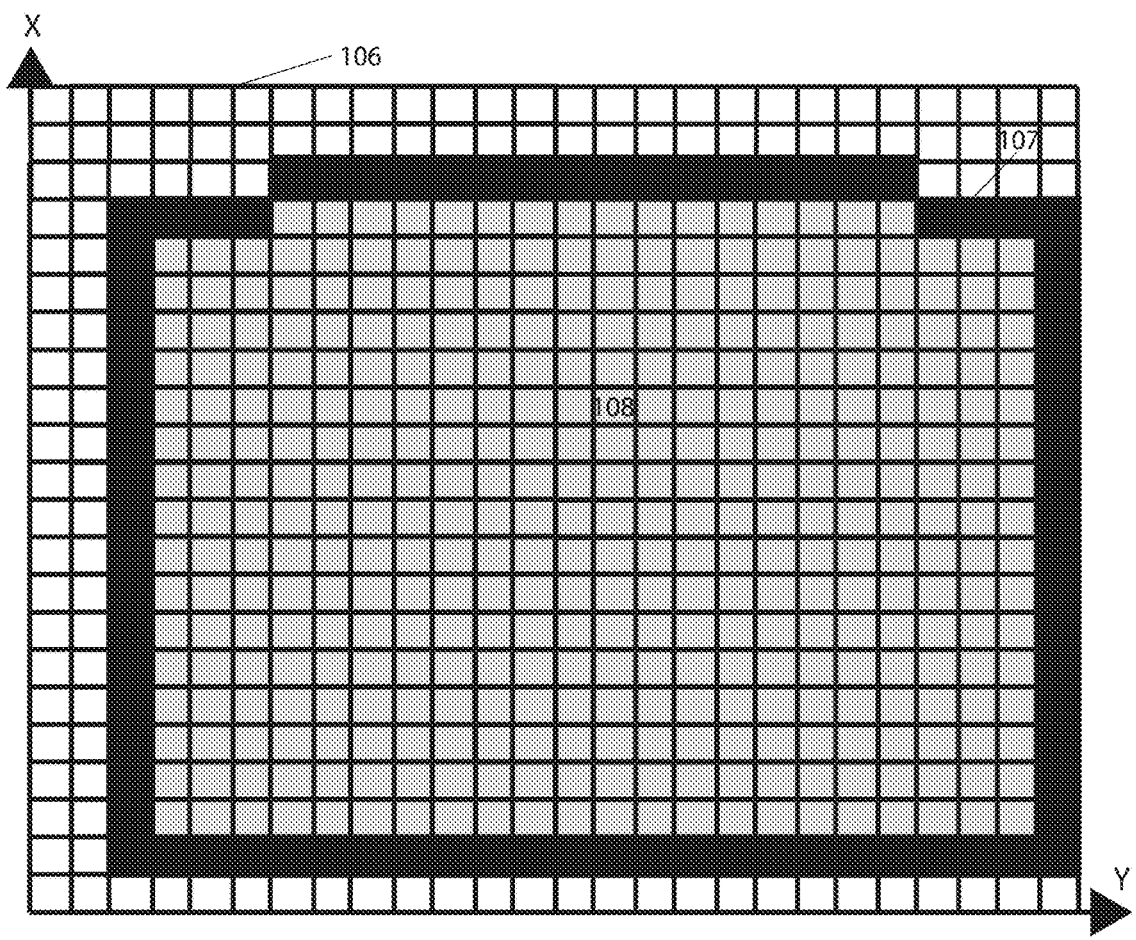
FIG. 2D illustrates marked perimeter and internal area of an entire place, as provided in some embodiments.

FIG. 2D illustrates all identified perimeter coordinates 107 corresponding to place 104 translated from depth estimates calculated from depth vectors measured by image sensor 100 to all perimeters of place 104. Perimeter coordinates identified in each new field of view of image sensor 100 as robotic device 101 moves around place 104 correspond to the current coordinate system observed by image sensor 100. Therefore, new perimeters identified in each new field of view correspond to a different coordinate system. To consolidate all perimeter coordinates into a single coordinate system, the processor transforms coordinates from each different coordinate system to a single coordinate system using a movement vector, such that all perimeter coordinates 107 can correspond to a single coordinate system as shown in FIG. 2D. The processor may use other methods of transforming the coordinate system to a single coordinate system.

In the examples provided, overlapping depth estimates, coordinates, and calculated depth vectors measured within two separate fields of view, are depicted to perfectly overlap one another. For example, FIG. 2B illustrates perimeter 107 resulting from depth vectors 102, 200, 201, and 202 taken within overlapping fields of view 103, 203, 204, and 205, respectively. For simplicity, perimeter coordinates 107 corresponding to overlapping depth vectors 102, 200, 201, and 202 taken within separate fields of view 103, 203, 204, and 205 respectively are exactly the same, thereby overlapping perfectly to form perimeter 107 as shown. Perimeter coordinates 107 are the combination of perimeter coordinates corresponding to different coordinate systems that the processor transformed as described above such that all perimeter coordinates correspond to single coordinate system 106.

In some embodiments, discrepancies between the values of overlapping depth estimates may occur and the processor may determine which of the two overlapping sets of depth estimates is more accurate. In some embodiments, the processor determines the accuracy of an identified perimeter by assigning a vote (or reward or other assigned point) to each coordinate marked as a perimeter each time a coordinate overlaps with a perimeter coordinate corresponding to a depth vector measured within a separate field of view. As the number of votes of a perimeter coordinate increases, it is more likely to represent the position of the actual perimeter. In some embodiments, coordinates with increased number of votes are considered to be more accurate. In another embodiment, coordinates with a number of votes below a specified threshold are ignored.

Figure 4A:
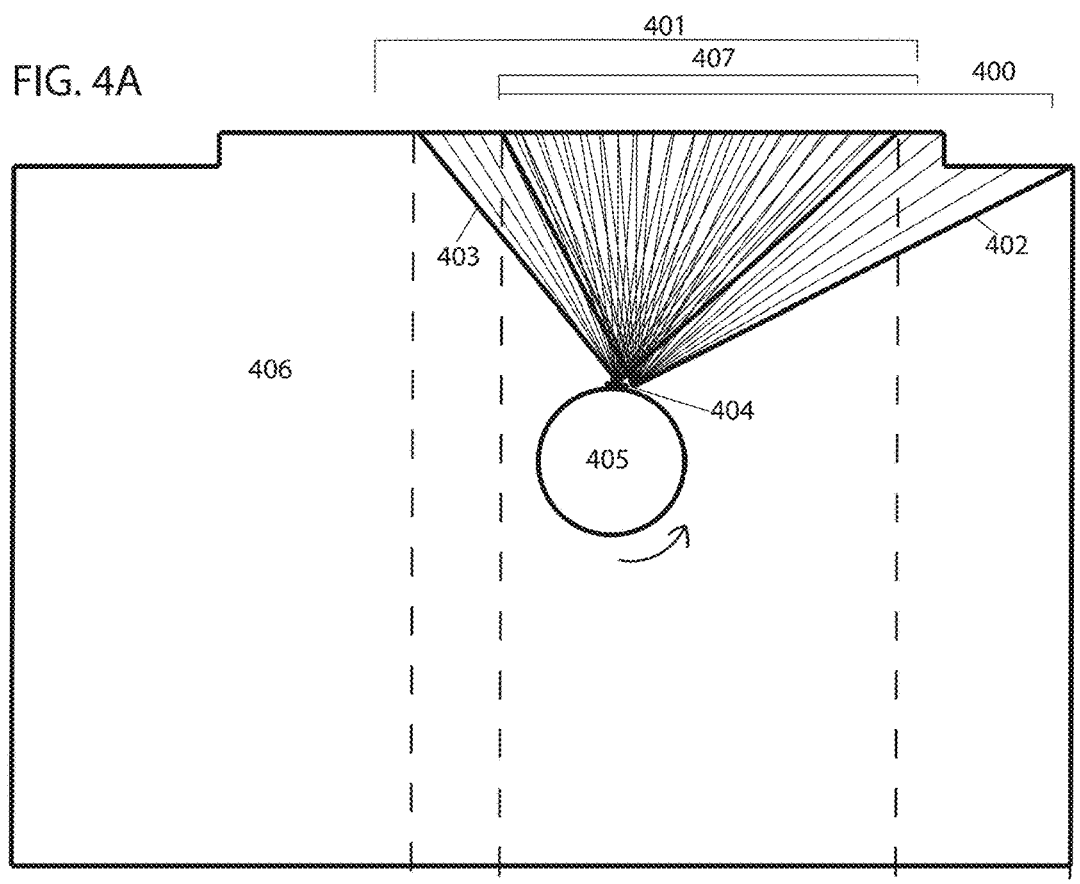
FIG. 4A illustrates depth vector measurements taken within two overlapping fields of view, as provided in some embodiments.
Figure 4B:
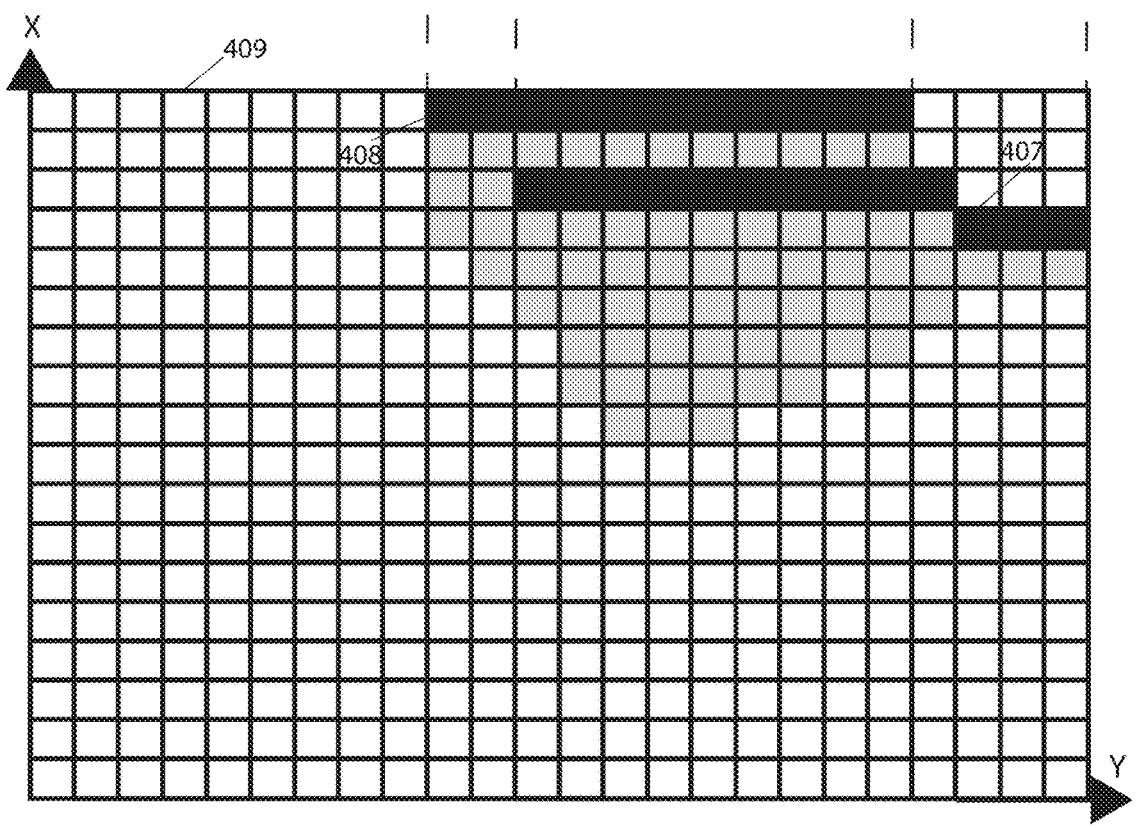
FIG. 4B illustrates staggered neighboring coordinates marked as perimeter corresponding to depth vector measurements taken within the two overlapping fields of view, as provided in some embodiments.

In some embodiments, neighboring perimeter coordinates corresponding to estimated depths to the same object may stagger rather than overlap due to noise, such as measurement noise, or due to an inaccuracy in calculations. For example, FIG. 4A illustrates an embodiment where depth vector measurements 400 and 401 are taken within overlapping fields of view 402 and 403 by depth measurement device 404 mounted on robotic device 405 within place 406. Depth vector measurements 407 from separate fields of view 402 and 403 overlap. Due to noise or inaccuracy in calculations, there are inconsistencies between the overlapping depth vector measurements and, hence, estimated depths and translated coordinates from separate fields of view 402 and 403. These inconsistencies result in staggered perimeter coordinates 407 and 408, respectively, within coordinate system 409. It is assumed the processor transformed coordinates 407 and 408 corresponding to different coordinate systems as described above such that they may both correspond to single coordinate system 409. In some embodiments, the processor uses a conservative approach wherein coordinates 407 are considered to be the perimeter as they are closer to the center of place 406. This approach would avoid contact between the robotic device and the wall of the place. In another embodiment, assuming coordinates 408 have a greater number of votes as compared to coordinates 407, the processor chooses perimeter coordinates 408 to be the perimeter of place 406. In yet another embodiment, the processor applies an averaging method or other mathematical method as described above to staggered perimeter coordinates 407 and 408 (or corresponding estimated depths or depth vectors) to determine an average estimate of the position of the perimeter.

Figure 5:
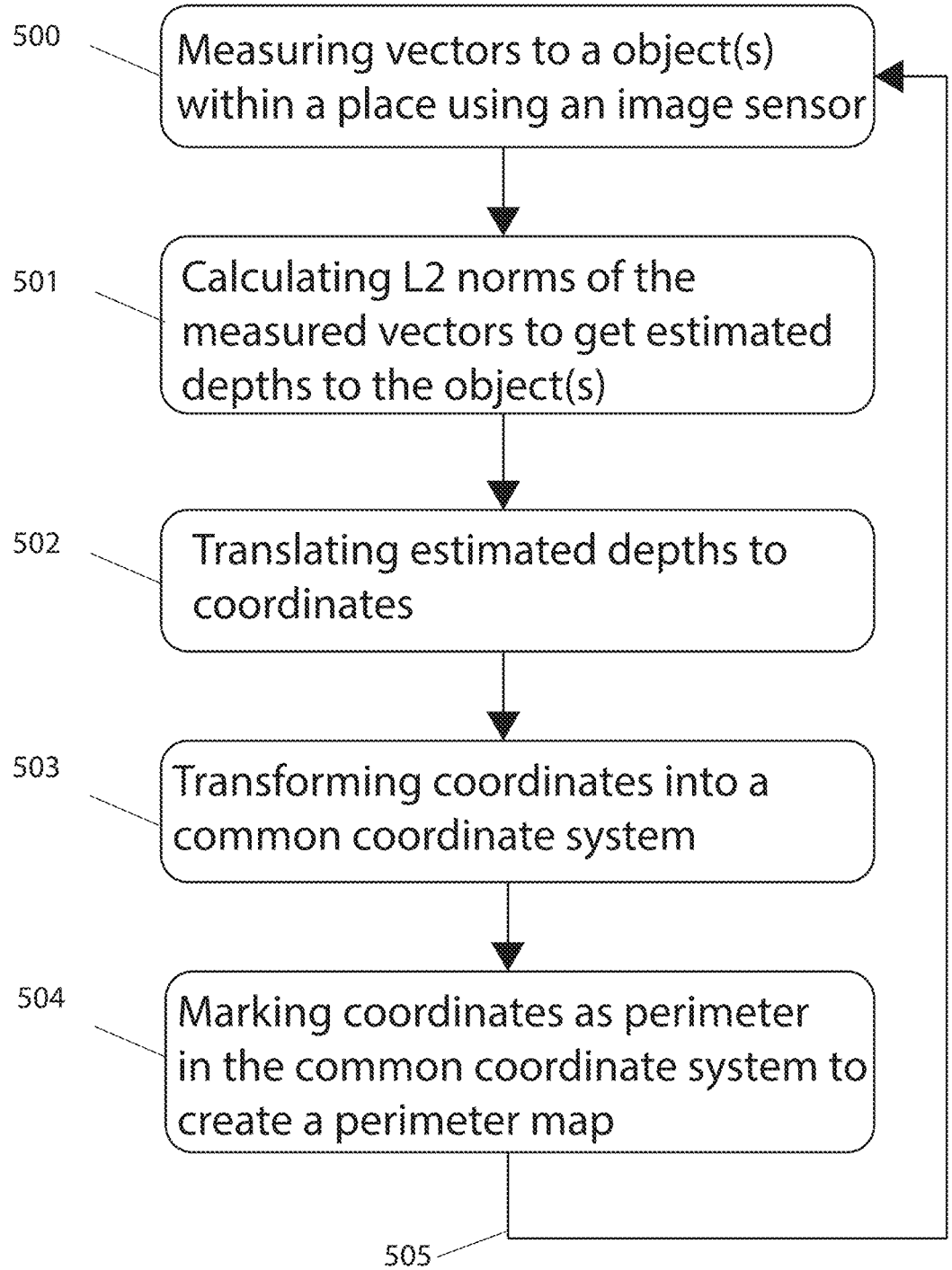
FIG. 5 illustrates a flow chart describing embodiments of a method for marking the perimeter of a place in a coordinate map, as provided in some embodiments.

FIG. 5 illustrates a flowchart describing embodiments of a method for creating a perimeter map of a place. In a first step 500, an image sensor is used to measure vectors to objects within a place. In a second step 501, a processor calculates L2 norms of the measured vectors to get estimated depths to the objects. In a third step 502, the processor translates estimated depths to coordinates within the current coordinate system of the image sensor. In a fourth step 503, the processor transforms the coordinates within the current coordinate system into coordinates within a common coordinate system using measured movement between frames captured by the image sensor, wherein each frame corresponds to a different coordinate system. In a fifth step 504, the transformed coordinates are marked as perimeter in the common coordinate system to create a perimeter map of the place. In a sixth step 505, the process is repeated as the image sensor moves and measures new vectors to objects within the place.

Figure 6:
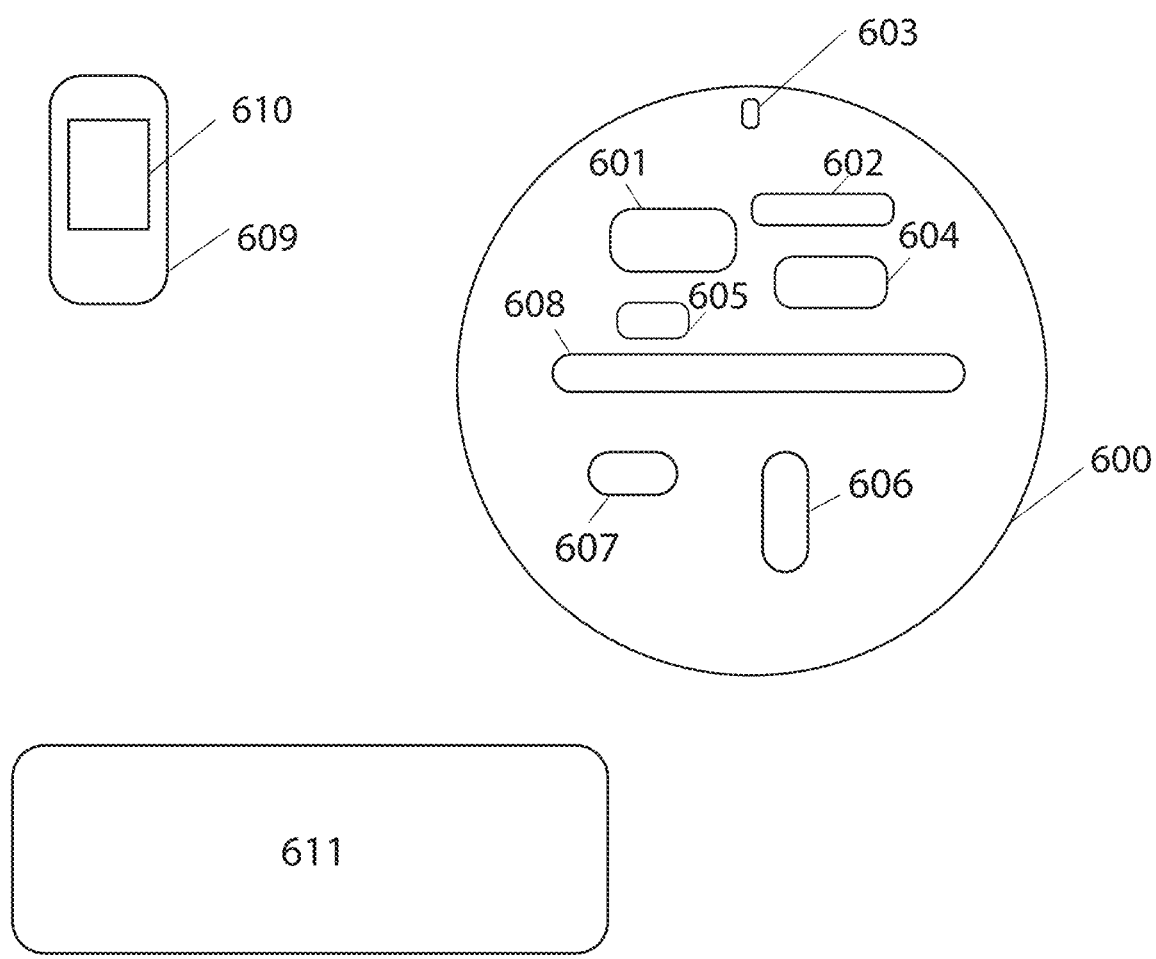
FIG. 6 illustrates an example of a robotic device and system as used in some embodiments.

FIG. 6 illustrates an example of a robotic device 600 with processor 601, memory 602, a first set of sensors 603, second set of sensors 604, network communications 605, movement driver 606, timer 607, and one or more cleaning tools 608. The first and second set of sensors 603 and 604 may include depth measuring devices, movement measuring devices, and the like. In some embodiments, the robotic device may include the features (and be capable of the functionality) of a robotic device described herein. In some embodiments, program code stored in the memory 602 and executed by the processor 601 may effectuate the operations described herein. Some embodiments additionally include user device 609 having a touchscreen 610 and that executes a native application by which the user interfaces with the robot. In some embodiments, the robotic device 600 may charge at a base station 611, which in some cases may house a processor and memory that implement some of the functionality described herein and which may wirelessly communicate with the robotic device 600. While many of the computational acts herein are described as being performed by the robot, it should be emphasized that embodiments are also consistent with use cases in which some or all of these computations are offloaded to a base station computing device on a local area network with which the robot communicates via a wireless local area network or a remote data center accessed via such networks and the public internet.

It should be emphasized that embodiments are not limited to techniques that construct a perimeter map in this way, as the present techniques may also be used for plane finding in augmented reality, barrier detection in virtual reality applications, outdoor mapping with autonomous drones, and other similar applications, which is not to suggest that any other description is limiting.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships (e.g., "in response to X, Y," "upon X, Y,", "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus specially designed to carry out the stated functionality, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct (e.g., reference to "parallel" surfaces encompasses substantially parallel surfaces). The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. Negative inferences should not be taken from inconsistent use of "(s)" when qualifying items as possibly plural, and items without this designation may also be plural.

What is claimed are:

1. A method for navigating and mapping a workspace, comprising:
   obtaining, with one or more processors, a stream of spatial data indicative of a robot's position in a workspace, the stream of spatial data being based on at least output of a first sensor, wherein obtaining the stream of spatial data comprises at least:
      obtaining, with the one or more processors, first depth data, wherein:

the first depth data indicates a first distance from the robot at a first position to a surface of, or in, the workspace in which the robot is disposed,
the first depth data indicates a first direction in which the first distance is measured,
the first depth data indicates the first distance and the first direction in a frame of reference of the robot, and
the frame of reference of the robot is different from a frame of reference of the workspace;
translating, with the one or more processors, the first depth data into translated first depth data that is in the frame of reference of the workspace; and
storing, with the one or more processors, the translated first depth data in memory;
obtaining, with one or more processors, a stream of movement data indicative of the robot's displacement in the workspace, the stream of movement data being based on at least output of a second sensor of different type than the first sensor;
navigating, with the one or more processors, along a path of the robot in the workspace based on the stream of spatial data;
while navigating, mapping, with the one or more processors, at least part of the workspace based on the stream of spatial data to form or update a spatial map in memory;
switching to a second mode of operation if the stream of spatial data is unavailable due to the first sensor becoming impaired or inoperative, the second mode of operation comprising:
navigating, with the one or more processors, along the path of the robot in the workspace based on the stream of movement data; and
indicating, with the one or more processors, in memory areas of the spatial map covered by the robot based on the stream of movement data;
wherein the spatial map of the at least part of the workspace expands as new areas of the workspace are covered by the robot and spatial data of the new areas of the workspace are obtained and used by the one or more processors to update the spatial map, and
wherein the spatial map of the at least part of the workspace is segmented into two or more zones depending on the layout of the work space.

2. The method of claim 1, wherein the robot completes operation in the two or more zones, each one after another.

3. The method of claim 1, wherein the robot is configured to operate in the two or more zones based on a schedule comprising a day and a time to operate in the two or more zones.

4. The method of claim 1, wherein the second sensor is an exteroceptive sensor or a proprioceptive sensor.

5. The method of claim 1, wherein each of the two or more zones is a room.

6. The method of claim 1, wherein the robot visits perimeters within the spatial map of the at least part of the workspace to verify the location of the perimeter using a third sensor of different type than the first and second sensors after covering all areas within the spatial map of the at least part of the workspace.

7. The method of claim 6, wherein the one or more processors updates perimeters with the spatial map of the at least part of the workspace after verification.

8. The method of claim 1, wherein the robot's movement traces along the perimeters of a first zone after covering all areas of the first zone within the spatial map of the at least part of the workspace and before beginning covering areas of a second zone within the spatial map of the at least part of the workspace.

9. The method of claim 1, further comprising capturing, with an exteroceptive depth sensor, distances to obstacles within the workspace, wherein the navigation of the robot is further refined based on output from the exteroceptive depth sensor.

10. The method of claim 9, wherein the one or more processors creates a second spatial map on top of the spatial map in a layered manner and wherein the second spatial map is created based on the output of the extroceptive depth sensor.

11. The method of claim 1, wherein the one or more processors segments the spatial map of the at least part of the workspace into the two or more zones based on an identified opening in a wall, wherein the identified opening in the wall is a doorway or a hallway.

12. The method of claim 1, wherein the two or more zones are independent.

13. The method of claim 12, wherein the one or more processors can be configured to actuate the robot to operate and execute tasks within the two or more zones independently with different frequencies or schedules.

14. The method of claim 1, wherein the one or more processors assigns each of the two or more zones a unique tag used in setting and controlling the operation and execution of tasks within the two or more zones.

15. The method of claim 14, wherein the unique tag is a description of a particular type of room.

16. The method of claim 15, wherein the particular type of room comprises one of a bedroom, a kitchen, a living room, a basement, a hallway, and a bathroom.

17. The method of claim 1, wherein the one or more processors maps all perimeters of the workspace during a first work session.

18. The method of claim 1, wherein the one or more processors implement incremental changes as they are discovered in consecutive work sessions to the spatial map of the at least part of the work space previously generated during a first work session.

19. The method of claim 18, wherein the one or more processors saves, discards, or uses in a current work session the incremental changes.

20. The method of claim 1, further comprising recognizing, with the one or more processors, areas previously visited by the robot.

21. The method of claim 1, wherein an application of a communication device is used to modify the spatial map of the at least part of the workspace.

22. The method of claim 21, wherein modifying the spatial map of the at least part of the workspace comprises one or more of: creating perimeters, adjusting perimeters, deleting perimeters, creating obstacles, adjusting obstacles, deleting obstacles, creating zones, adjusting zones, deleting zones, assigning coverage of zones, assigning order of coverage of zones, and assigning one or more actions to zones.

23. The method of claim 1, wherein at least some data processing is offloaded from the one or more processors to the cloud.

24. The method of claim 1, wherein the movement data comprises odometry data.

25. The method of claim 1, wherein the movement data is at least based on output from an optoelectrical exteroceptive sensor of a type different from the second sensor.

26. The method of claim 1, further comprising determining that an exteroceptive sensor of the robot is impaired or inoperative.

27. The method of claim 1, further comprising navigating along the path of the robot in the workspace based on both the stream of spatial data and the stream of movement data.

28. The method of claim 1, further comprising after navigating along the path, if at least a portion of the stream of spatial data is unavailable, mapping at least another part of the workspace based on the stream of movement data and output of a contact sensor of the robot.

29. The method of claim 1, further comprising determining that an exteroceptive sensor has ceased to be impaired or inoperative.

30. The method of claim 29, comprising, in response to determining that the exteroceptive sensor has ceased to be impaired or inoperative, navigating along the path of the robot in the workspace based on the stream of spatial data.

31. The method of claim 29, comprising, in response to determining that the exteroceptive sensor has ceased to be impaired or inoperative, navigating along the path of the robot in the workspace based on the stream of odometry data.

32. The method of claim 29, comprising, in response to determining that the exteroceptive sensor has ceased to be impaired or inoperative, updating the map based on the stream of spatial data and designating in the updated spatial map the areas covered by the robot based on the stream of movement data.

33. The method of claim 29, comprising, in response to determining that the exteroceptive sensor has ceased to be impaired or inoperative, navigating the robot to a boundary of the workspace and then navigating the robot adjacent the perimeters.

34. The method of claim 33, wherein navigating the robot adjacent the perimeters of the workspace comprises navigating along a perimeter of the workspace.

35. The method of claim 1, wherein the first sensor is an exteroceptive sensor and the second sensor is a proprioceptive sensor, and the exteroceptive sensor and proprioceptive sensor are of two different types and the two different types are passive or active.

36. The method of claim 1, wherein:
the method is executed by the robot;
the robot is a floor cleaning robot; and
the robot is configured to concurrently map the workspace and localize the robot in the workspace based on the stream of spatial data.

37. The method of claim 1, further comprising:
obtaining, with the one or more processors, second depth data, wherein:
the second depth data indicates a second distance from the robot at a second position to the surface or another surface of, or in, the workspace,
the second depth data indicates a second direction in which the second distance is measured, and
the second depth data indicates the second distance and the second direction in the frame of reference of the robot;
translating the second depth data into translated second depth data that is in the frame of reference of the workspace; and storing the translated second depth data in memory.

38. The method of claim 1, further comprising:
quantizing the first translated depth data into a unit cell in a matrix of spatial cells; and mapping the at least part of the workspace based on the unit cell.

39. The method of claim 1, wherein:
the robot is a floor cleaning robot comprising a vacuum;
the robot is configured to determine and navigate along the path bounded, at least in part, by perimeters of the workspace;
the robot is configured to move with two or three degrees of freedom in the workspace;
the robot is configured to concurrently localize the robot in the workspace and map the workspace;
the frame of reference of the robot is a two-dimensional frame of reference; and
a unit cell of the spatial map comprises a value in a bitmap in which at least some values indicate whether locations correspond to perimeters, areas beyond the perimeters, or within the perimeters of the workspace.

40. The method of claim 1, wherein the one or more processor dynamically adjusts the influence that the stream of spatial data and the movement data has on determining the robot's position in the workspace or mapping of dimensions of the workspace.

41. The method of claim 1, further comprising determining that the first sensor is no longer impaired or inoperative and in response to determining that the first sensor is no longer impaired or inoperative deactivating the second mode of operation.

42. The method of claim 1, wherein the workspace is a residential establishment.

43. The method of claim 1, wherein the one or more processors identifies an opening in a wall and actuates the robot to explore areas beyond the opening.

44. The method of claim 43, wherein the opening in the wall is a hallway or a door.

45. A robot, comprising:
a drive motor of the robot;
a cleaning tool of the robot;
an exteroceptive sensor of the robot;
a proprioceptive sensor of the robot;
one or more processors of the robot; and
memory of the robot storing instructions that when executed by at least some of the one or more processors effectuate operations comprising:
obtaining, with one or more processors, a stream of spatial data indicative of a robot's position in a workspace, the stream of spatial data being based on at least output of a first sensor, wherein obtaining the stream of spatial data comprises at least:
obtaining, with the one or more processors, first depth data, wherein:
the first depth data indicates a first distance from the robot at a first position to a surface of, or in, the workspace in which the robot is disposed,
the first depth data indicates a first direction in which the first distance is measured,
the first depth data indicates the first distance and the first direction in a frame of reference of the robot, and
the frame of reference of the robot is different from a frame of reference of the workspace;
translating, with the one or more processors, the first depth data into translated first depth data that is in the frame of reference of the workspace; and
storing, with the one or more processors, the translated first depth data in memory;
obtaining, with one or more processors, a stream of movement data indicative of the robot's displacement in the workspace, the stream of movement data being based on at least output of a second sensor;

navigating, with the one or more processors, along a path of the robot in the workspace based on the stream of spatial data;

while navigating, mapping, with the one or more processors, at least part of the workspace based on the stream of spatial data to form or update a spatial map in memory;

switching to a second mode of operation if the stream of spatial data is unavailable due to the first sensor becoming impaired or inoperative, the second mode of operation comprising:

navigating, with the one or more processors, along the path of the robot in the workspace based on the stream of movement data; and indicating, with the one or more processors, in memory areas of the spatial map covered by the robot based on the stream of movement data;

wherein the spatial map of the at least part of the workspace expands as new areas of the workspace are covered by the robot and spatial data of the new areas of the workspace are obtained and used by the one or more processors to update the spatial map, and wherein the spatial map of the at least part of the workspace is segmented into two or more zones.

46. The robot of claim 45, wherein the operations further comprising after navigating along the path, if at least a portion of the stream of spatial data is unavailable, mapping at least another part of the workspace based on the stream of movement data and output of a contact sensor of the robot.

* * * * *